US005493431A

United States Patent [19]
Baba et al.

[11] Patent Number: 5,493,431
[45] Date of Patent: Feb. 20, 1996

[54] LIQUID CRYSTAL DISPLAY DEVICE WITH COMPENSATORS

[75] Inventors: Yumi Baba, Hamamatsu; Hiroshi Ohnishi; Toshiyuki Yoshimizu, both of Nara; Keiko Kishimoto, Osaka, all of Japan

[73] Assignee: Sharp Kabushiki Kaisha, Osaka, Japan

[21] Appl. No.: 10,362

[22] Filed: Jan. 28, 1993

[30] Foreign Application Priority Data

Jan. 30, 1992 [JP] Japan ..................... 4-015346

[51] Int. Cl.⁶ ............................. G02F 1/1335
[52] U.S. Cl. ............................. 359/73; 359/102
[58] Field of Search ................. 359/73, 102, 53; 437/51, 52, 56

[56] References Cited

U.S. PATENT DOCUMENTS

| | | | |
|---|---|---|---|
| 4,909,606 | 3/1990 | Wada et al. | 359/73 |
| 5,124,824 | 6/1992 | Kozaki et al. | 359/73 |
| 5,126,866 | 6/1992 | Yoshimizu et al. | 359/73 |
| 5,142,393 | 8/1992 | Okumura et al. | 359/73 |
| 5,175,638 | 12/1992 | Kanemoto et al. | 359/73 |
| 5,194,975 | 3/1993 | Akatsuka et al. | 395/73 |
| 5,213,852 | 5/1993 | Arakawa et al. | 359/73 |
| 5,245,456 | 9/1993 | Yoshimi et al. | 359/73 |

FOREIGN PATENT DOCUMENTS

| | | |
|---|---|---|
| 0412844A1 | 2/1991 | European Pat. Off. |
| 0424951A1 | 5/1991 | European Pat. Off. |
| 0478383A3 | 4/1992 | European Pat. Off. |
| WO9011546 | 10/1990 | WIPO |

Primary Examiner—William L. Sikes
Assistant Examiner—Kenneth Parker

[57] ABSTRACT

A liquid crystal display device of stable color tone uses phase difference plates made of a uniaxially stretched polymer film and comprises a polarizer plate, a first phase difference plate, a second phase difference plate, a supertwisted nematic type liquid crystal display panel, and a polarizer plate which are stacked on each other in this order. The rate of retardation change with the change in viewing angle of the uniaxially stretched polymer film is denoted coefficient K defined by three-dimensional refractive indexes, coefficient K1 of one of the phase difference plates is set in a range of $-1 \leq K1 \leq 0.17$ and coefficient K2 of the other phase difference plate is set in a range of $0 \leq K2 \leq 1$.

2 Claims, 22 Drawing Sheets

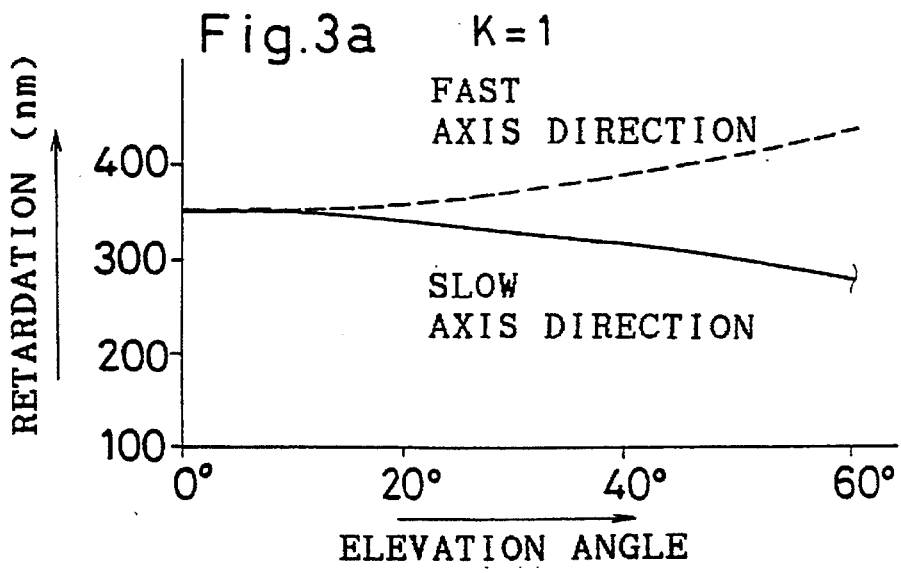
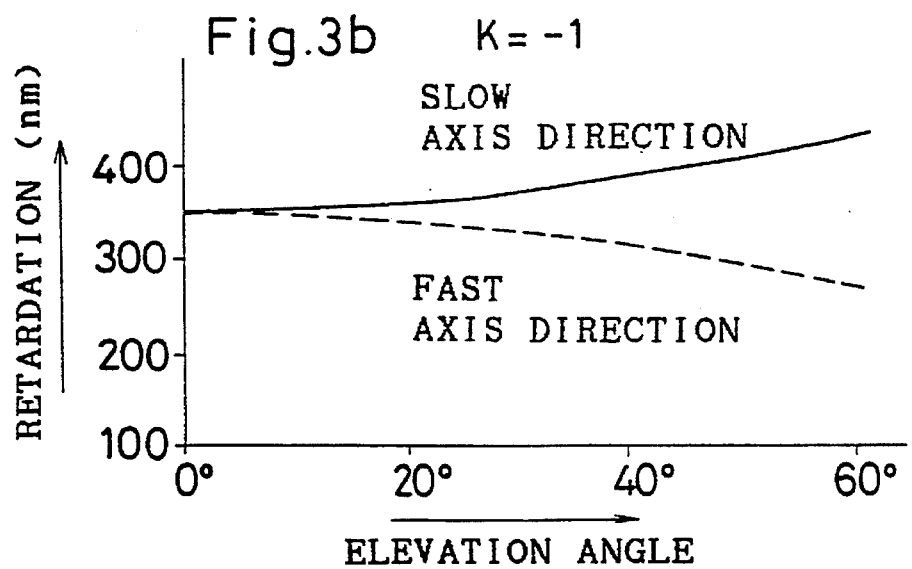
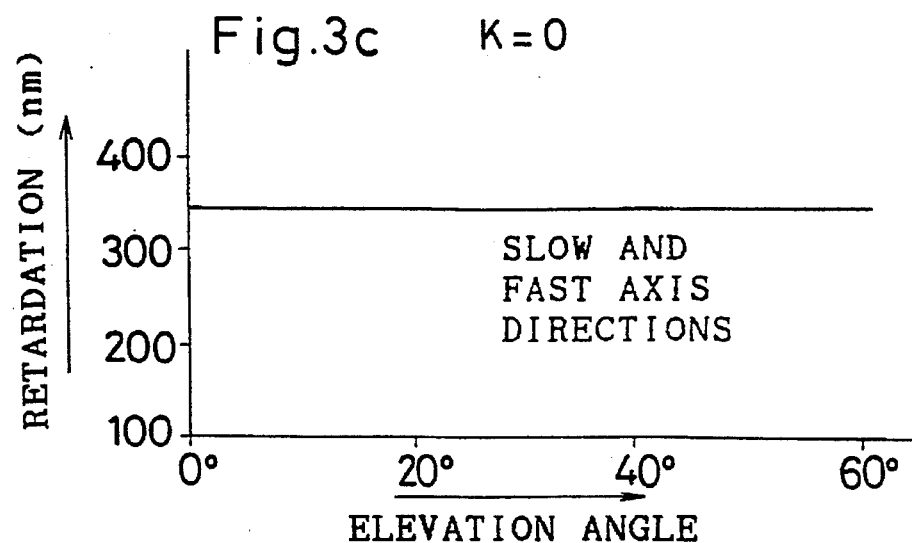

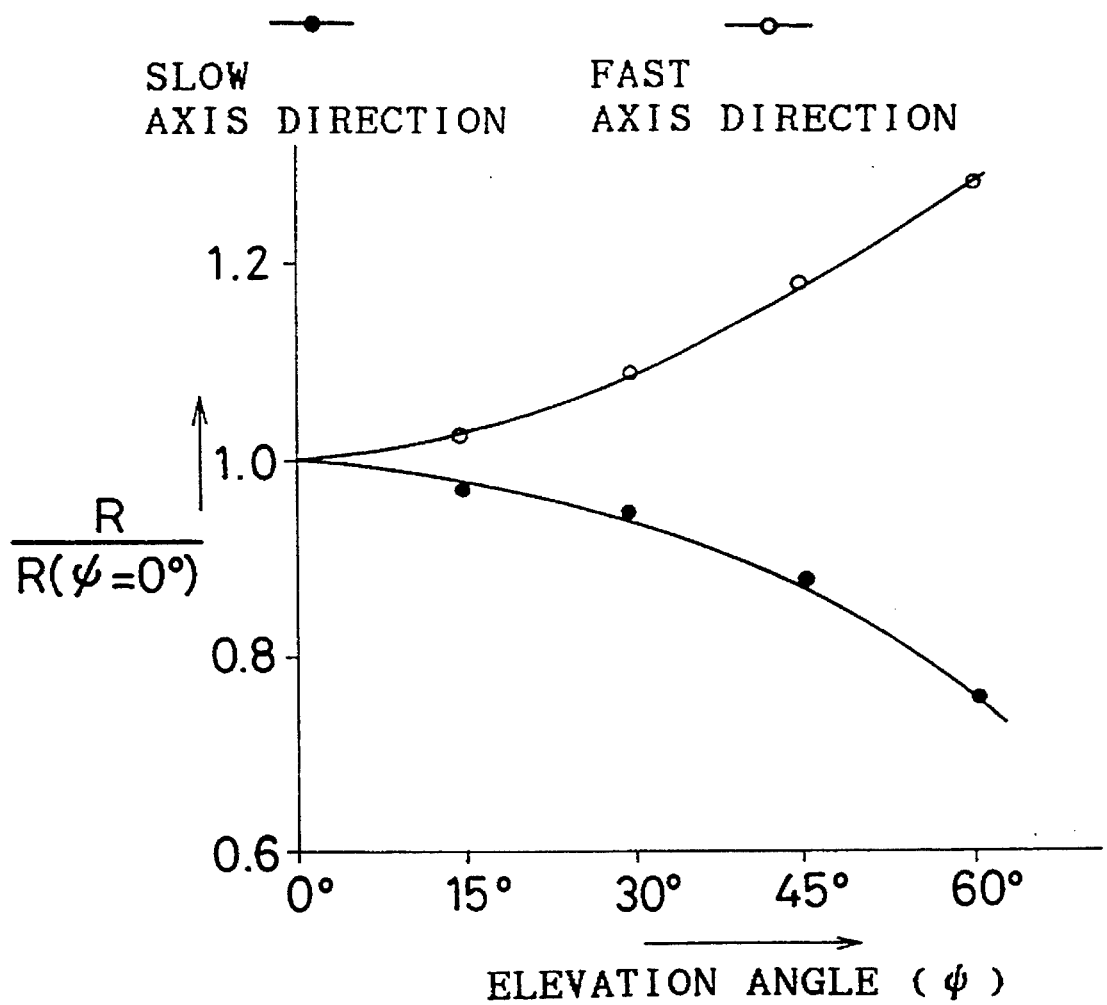

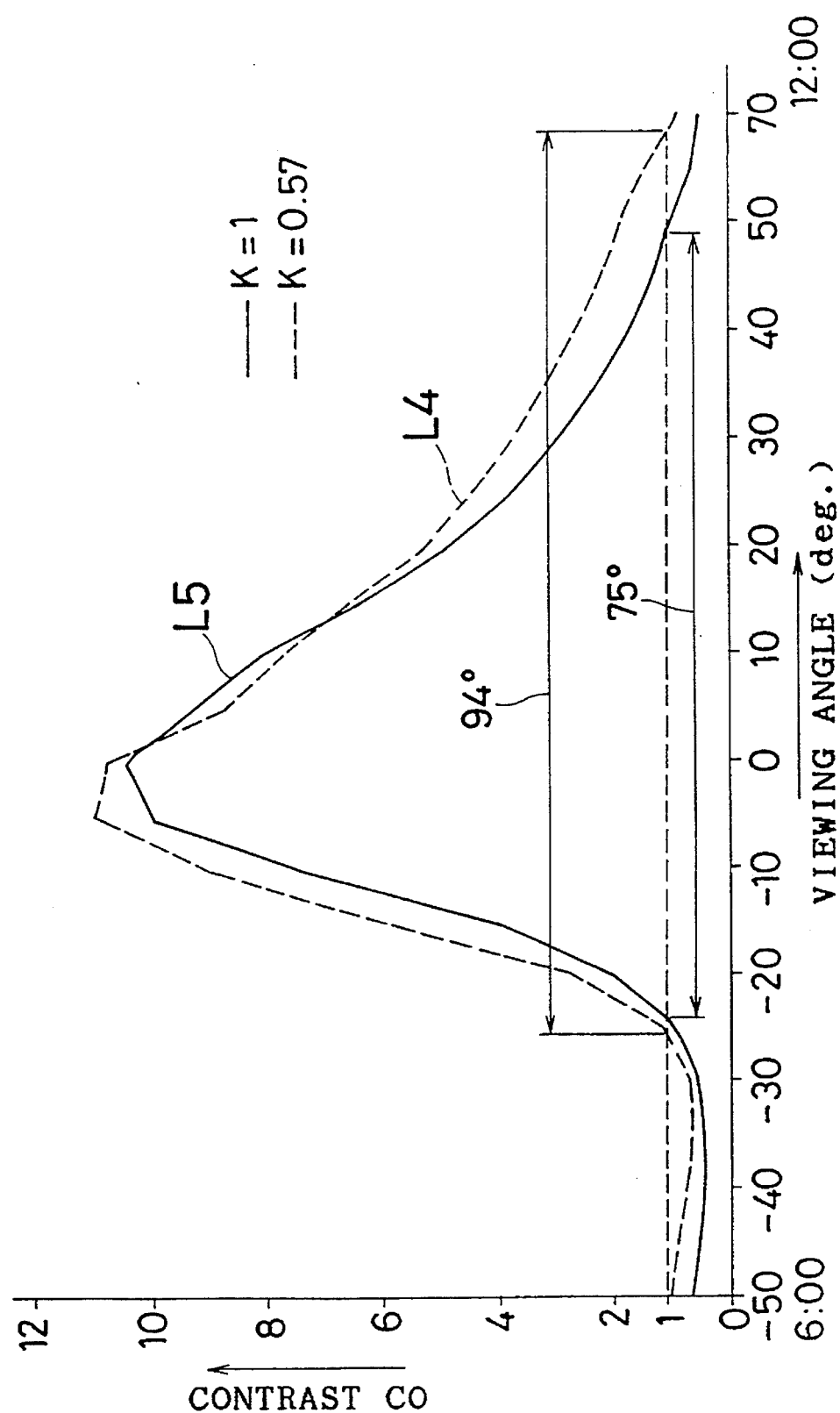

LIQUID CRYSTAL DISPLAY DEVICE WITH COMPENSATORS

BACKGROUND OF THE INVENTION

1. Field of the Invention

The present invention relates to a super twisted nematic type liquid crystal display device used as the display unit for word processors, personal computers and other office automation equipment.

2. Description of the Related Art

Generally a supertwisted nematic (STN) liquid crystal display device is colored in yellow-green or blue, but the color is corrected by using optical compensation plates to obtain a bright and sharp black and white display. This improves the display quality and makes the device applicable for use as the display unit of word processors apparatuses, personal computers and other office automation equipment.

As an STN type liquid crystal display device using optical compensation plates, there is a two-layer STN type liquid crystal display device using two panels stacked on each other, where the coloration taking place in the first panel used in display driving is compensated for by the second layer (optical compensation panel) to provide a colorless display. This two-layer configuration requires two liquid crystal panels, as compared with the single-layer STN liquid crystal display device, resulting in increased thickness of the display device and consequently increasing the weight.

To solve this problem, a thin and light-weight STN type liquid crystal display device has been developed by using a positive phase difference plate made of a uniaxially stretched polymer film with coefficient K=1 as the optical compensation plate. The coefficient K is a value representing the rate of retardation change of light viewed through the film as the inclination of the viewing direction, or "elevation angle," changes. In a uniaxially stretched polymer film exhibiting anisotropic optical properties, the coefficient K is defined by the mutually orthogonal three-dimensional refractive indices of the film (in two directions along the film plane and in a third direction normal to the film plane). In the description which follows, the elevation angle is measured from a direction normal to the plane of the film. Range of the coefficient is $0 \leq K \leq 1$ for a positive phase difference plate and $-1 \leq K \leq 0$ for a negative phase difference plate. The phase difference plate is, however, in general manufactured by stretching a polymer film, and therefore has optical properties different between the slow/axis direction and the fast/axis direction. Consequently, there is a problem, as compared with the two-layer STN type liquid crystal display device, that the color change due to the azimuth or elevation angle is greater in the STN liquid crystal display device of phase difference plate type, that is, the viewing angle is narrower.

The reason for using a uniaxially stretched polymer film as a phase difference plate is the optical anisotropy of the film. That is, a polymer film has different refractive indices between the fast axis direction and the slow axis direction (birefringence). The retardation (Δn×d), given by the product of this refractive anisotropy Δn and the film thickness d, is a physical quantity which gives the phase difference of light taking place as it passes through the film, and this value changes with the elevation angle differently between the slow axis direction and the fast axis direction.

In a phase difference plate made of polyvinyl alcohol, for example, the retardation decreases in the slow axis direction and increases in the fast axis direction as the elevation angle increases. As a result, when combined with a liquid crystal display panel, the difference in retardation between the phase difference plate and the liquid crystal display panel increases as the elevation angle increases, even if the optical compensation relation is perfect in the normal direction, and consequently the optical compensation relation collapses. In other words, a color change occurs and the display contrast decreases, resulting in narrower viewing angle.

SUMMARY OF THE INVENTION

The object of the invention is to provide a liquid crystal display device capable of giving a black and white display of a stable color tone and a wide viewing angle.

The invention provides a liquid crystal display device which uses an optical compensation plate made of a uniaxially stretched polymer film and comprises a first polarizer plate, a first optical compensation plate, a second optical compensation plate, a supertwisted nematic type liquid crystal display panel and a second polarizer plate which are stacked on each other in this order, in which the coefficient K1 of the first optical compensation plate is set in a range of $$-1 \leq K1 \leq 0.17 \tag{1}$$

and the coefficient K2 of the second optical compensation plate is set in a range of $$0 \leq K2 \leq 1 \tag{2}$$

In another embodiment of the invention, coefficients K1 and K2 of the first and second optical compensation plates are set in a range of $$-1 \leq K1.K2 \leq 0 \tag{3}$$

The invention further provides a liquid crystal display device which uses an optical compensation plate made of a uniaxially stretched polymer film and comprises a first polarizer plate a first optical compensation plate, a supertwisted nematic type liquid crystal display panel, a second optical compensation plate and a second polarizer plate which are stacked on each other in this order, in which coefficients K1 and K2 of the first and second optical compensation plates are set in a range of $$-1 \leq K1.K2 \leq 0.25 \tag{4}$$

According to the invention, an increased viewing angle of the STN liquid crystal display device of phase difference plate type can be obtained if the values of retardation of the liquid crystal display panel and the adjacent phase difference plate remain equal to each other as the elevation angle increases, to maintain the relation of optical compensation. For this purpose, change in retardation of the adjacent phase difference plate must be made equal to the change in retardation of the liquid crystal display panel with the elevation angle. Thus a liquid crystal display device capable of black and white display with restrained change in the color tone with the elevation angle and having a wide viewing angle can be obtained by using a phase difference plate having a retardation change with the elevation angle being different from that of positive phase difference plate of a coefficient K=1, unlike conventional method where only a phase difference plate (which corresponds to coefficient K=1) of positive optical anisotropy is used.

When a negative phase difference plate which undergoes retardation change with the elevation angle different from that of a positive phase difference plate with coefficient K=1, namely a phase difference plate with coefficient K=−1 for example, is used, two phase difference plates having different retardation behaviors with coefficients K=1 and K=−1 (a phase difference plate which changes the retardation with the elevation angle in a manner opposite to that of a phase difference plate with coefficient K=1 and is made of, for example, polystyrene) must be disposed so that the slow axes of the two phase difference plates are parallel to each other. By using a so-called three-dimensional refractive index controlling phase difference plate (3DRF phase difference plate) which satisfies the aforementioned requirement with a single sheet of film and arranging it according to a coefficient K obtained for the optimum three-dimensional refractive index, a liquid crystal display device with less number of films and light weight capable of sharp black and white display having a wide viewing angle can be obtained.

According to the invention, as described above, a liquid crystal display device capable of displaying in black and white with restrained tone change due to the elevation angle and having a wide viewing angle can be obtained by combining a negative phase difference plate of a retardation change with the elevation angle different from that of a positive phase difference plate with coefficient K=1, namely a phase difference plate with coefficient K=−1 for example. Thus, while two phase difference plates of different values of retardation with coefficients K=1 and K=−1 must be arranged so that the slow axes of the two phase difference plates are parallel to each other, by using a so-called three-dimensional refractive index controlling phase difference plate which satisfies the aforementioned requirement with a single sheet of film and arranging it according to a coefficient K obtained for the optimum three-dimensional refractive indices, a liquid crystal display device with less number of films and light weight which is capable of sharp black and white display and a wide viewing angle can be obtained.

BRIEF DESCRIPTION OF THE DRAWINGS

Other and further objects, features, and advantages of the invention will be more explicit from the following detailed description taken with reference to the drawings wherein:

FIGS. 3a, 3b and 3c are graphs showing the change in retardation of a phase difference plate with the change in elevation angle.

FIG. 4 is a graph showing the change in retardation of a positive phase difference plate, made of polycarbonate with coefficient K=1, with the change in elevation angle.

FIG. 11 is a graph showing the viewing angle characteristic in the second embodiment of the invention.

DETAILED DESCRIPTION OF THE PREFERRED EMBODIMENTS

Figure 1:
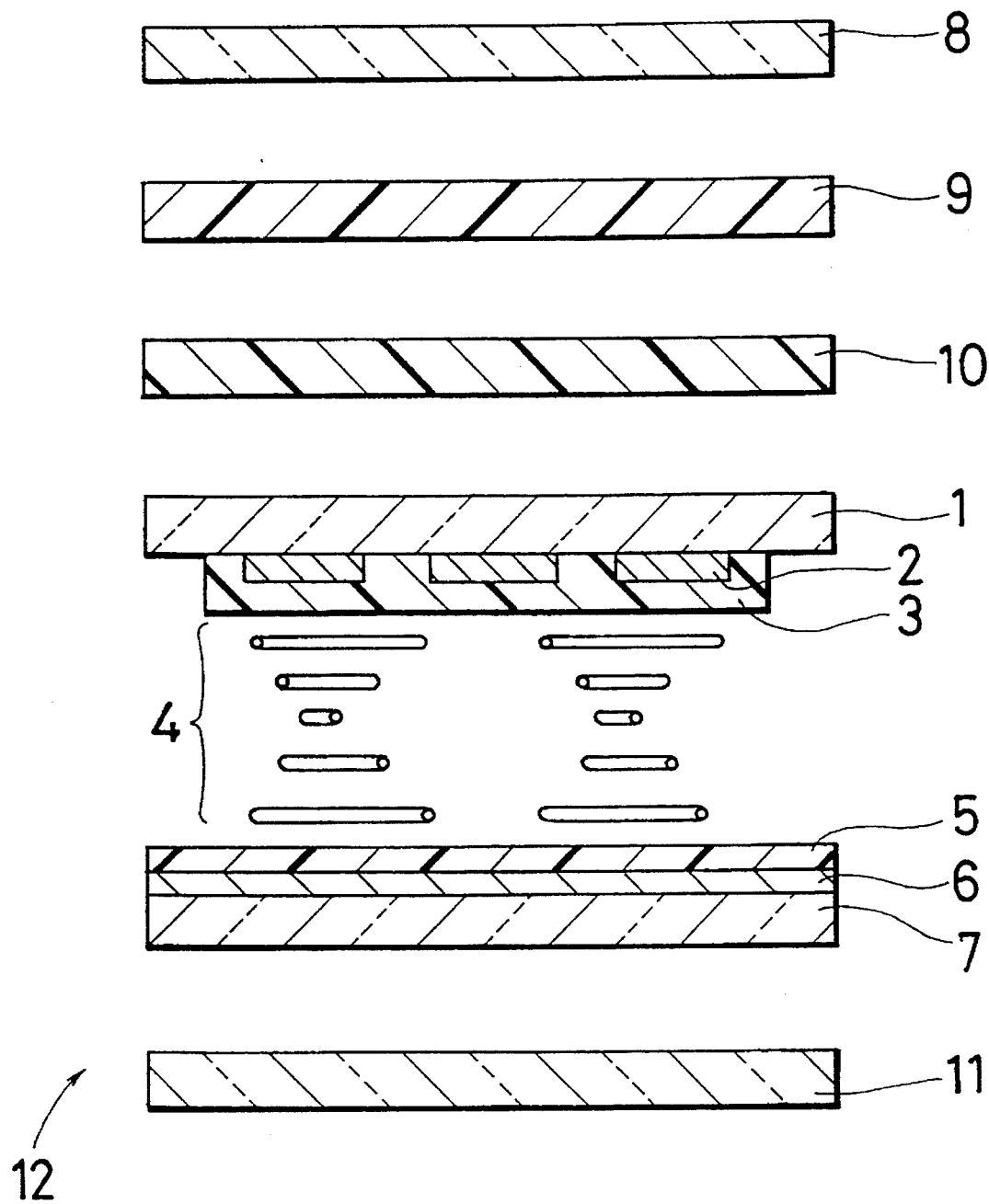
FIG. 1 shows an exploded sectional view of a liquid crystal display device 12 of the first embodiment of the invention.

Now referring to the drawing, preferred embodiments of the invention are described below.

First Embodiment

FIG. 1 shows an exploded sectional view of a liquid crystal display device 12 in the first embodiment of the invention. Transparent glass substrates 1, 7 are provided with transparent electrodes 2, 6 made of ITO (indium-tin oxide) formed on the opposing faces thereof. The electrodes may be formed in any of the patterns of segment type and simplified matrix type. The faces of the glass substrates 1, 7 with the transparent electrodes 2, 6 formed thereon are also provided with organic orientation films 3, 5 made of polyimide resin or the like formed almost all over thereof.

The organic orientation films 3, 5 have been subjected to orientation treatment by rubbing so that liquid crystal molecules of a liquid crystal layer 4 interposed between the substrates 1, 7 are twisted by 240 degrees. As the liquid crystal material for the liquid crystal layer 4, a nematic liquid crystal having a positive dielectric anisotropy is used, for example, a mixed liquid crystal prepared by adding 1.75% of cholesterylnonanoate (CN) as chiral dopant, for the purpose of controlling the twisting direction, to phenylcyclohexane (PCH) liquid crystal. The refractive anisotropy Δn of the mixed liquid crystal is 0.116, and the thickness of the liquid crystal layer 4 is 7.5 μm.

The glass substrates 1, 7 are provided with polarizer plates 8, 11, respectively, disposed on the surfaces opposite to the liquid crystal layer 4. For the polarizer plates 8, 11, neutral gray type polarizer plates of individual transmittance 42% and degree of polarization 99.9% are used.

Interposed between the glass substrate 1 and the polarizer plate 8 are phase difference plates 9, 10 which act as the first and second optical compensation plates. The phase difference plates 9, 10 are made of polycarbonate both having retardation of 390 nm.

The liquid crystal display device 12 thus consists of the polarizer plate 8, the phase difference plate 9, the phase difference plate 10, the liquid crystal display panel and the polarizer plate 11 which are stacked on each other in this order.

Figure 2:
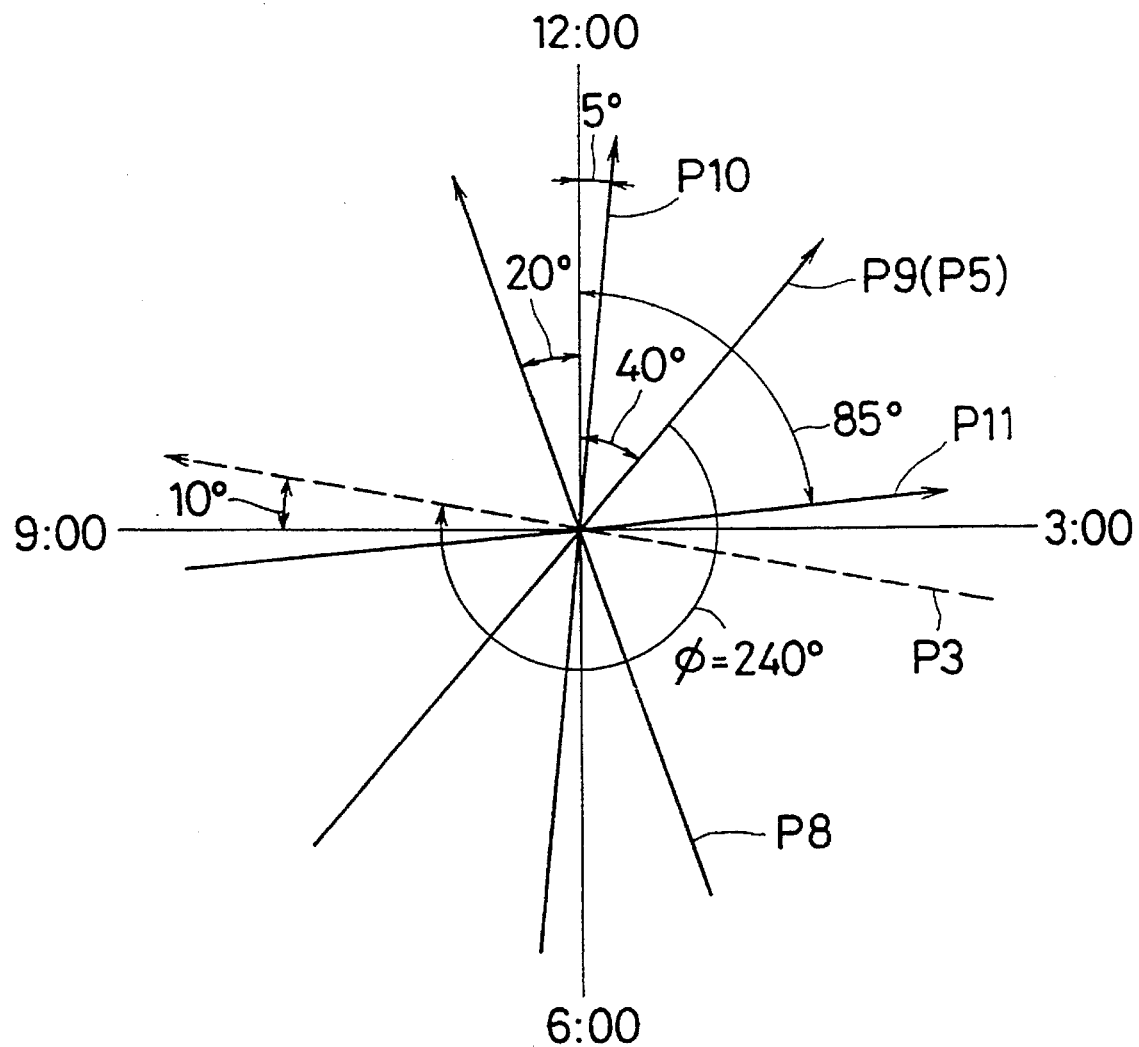
FIG. 2 is a diagram showing the arrangement of the members of the liquid crystal display device 12 of the first embodiment.

FIG. 2 is a diagram showing the orientation of the members of the liquid crystal display device 12. The liquid crystal molecule orientation axis (rubbing axis) direction of the organic orientation film 3 formed on the glass substrate 1 is, as indicated by arrow P3, inclined by 10 degrees from the direction of 9:00 clockwise. The liquid crystal molecule orientation axis direction of the organic orientation film 5 formed on the glass substrate 7 is, as indicated by arrow P5, inclined by 40 degrees from the direction of 12:00 clockwise, Consequently, the twisting angle Φ of the liquid crystal molecules is set at 240 degrees clockwise.

Absorption axis direction of the polarizer plate 8 is, as indicated by arrow P8, inclined by 20 degrees from the direction of 12:00 counterclockwise. Absorption axis direction of the polarizer plate 11 is, as indicated by arrow P11, inclined by 85 degrees from the direction of 12:00 clockwise. And slow axis direction of the phase difference plate 9 is, as indicated by arrow P9, inclined by 40 degrees from the direction of 12:00 clockwise. Slow axis direction of the phase difference plate 10 is, as indicated by arrow P10, inclined by 5 degrees from the direction of 12:00 clockwise.

The phase difference plates 9, 10 are made by stretching a polycarbonate film uniaxially. The reason for using uniaxially stretched polymer film as phase difference plates is the fact that the film has optical anisotropy, that is, a difference in the refractive index between the slow axis direction and the fast axis direction.

Relative phase difference in light (ordinary ray and extraordinary ray) which has passed the liquid crystal display panel is either canceled by the product of refractive anisotropy Δn and film thickness d, namely the retardation, or aligned in phase for all wavelengths, when the light passes through the phase difference plate. However, this is a phenomenon observed when viewing the liquid crystal display panel in the normal direction. If it is viewed obliquely, that is, when the viewing angle is taken into consideration, three-dimensional refractive indices of the phase difference plate must be accounted for. With the refractive indices of the phase difference plate in three orthogonal directions denoted as X (slow axis direction), Y (fast axis direction) Z (thickness direction), and the relationship between the refractive indices in the three orthogonal directions is given as follows in terms of coefficient K.

In case of a phase difference plate having positive optical anisotropy, $$(X+Y)/2 > Z \tag{5}$$

and the coefficient K is given as $$K = 1 - (Z-Y)/(X-Z) \tag{6}$$

where $X \neq Z$.

In case of a phase difference plate having negative optical anisotropy, $$(X+Y)/2 < Z \tag{7}$$

and the coefficient K is given as $$K = (X-Z)/(Z-Y) - 1 \tag{8}$$

where $Z \neq Y$.

If refractive indices X, Y and Z satisfy the relationship $$(X+Y)/2 = Z \tag{9}$$

then coefficient K becomes $$K = 0 \tag{10}$$

The refractive anisotropy and retardation, when viewed in the slow and fast directions, are given as follows, with the elevation angle of the phase difference plate from the normal direction denoted as Φ.

When viewed in the slow direction, refractive anisotropy ΔX is given by $$\Delta X (X^2 Z^2 / (X^2 \sin^2 \Phi + Z^2 \cos^2 \Phi)^{1/2} - Y \tag{11}$$

And the phase difference Rx is given by $$Rx = \Delta X \times d / \cos \Phi \tag{12}$$

When viewed in the fast direction, refractive anisotropy ΔY is given by $$\Delta Y = X - \{Y^2 Z^2 / (Y^2 \sin^2 \Phi + Z^2 \cos^2 \Phi)^{1/2} \tag{13}$$

And the phase difference Ry is given by $$Ry = \Delta Y \times d / \cos \Phi \tag{14}$$

FIGS. 3a, 3b and 3c are graphs showing the change in retardation of the phase difference plate with the elevation angle. FIG. 3a shows the case of phase difference plate with coefficient K=1, FIG. 3b shows the case of phase difference plate with coefficient K=−1, and FIG. 3c shows the case of phase difference plate with coefficient K=0. By measuring the refractive indices in three orthogonal directions of a positive phase difference plate with coefficient K=1, a negative phase difference plate with coefficient K=−1 and a phase difference plate with coefficient K=0 and substituting the measured values in the above equations (11) through (14), the graph shown in FIGS. 3a, 3b and 3c are obtained.

The graphs shown in FIGS. 3a, 3b and 3c indicates that the change in retardation with elevation angle is different between positive and negative phase difference plates, namely retardation decreases in the slow axis direction and increases in the fast axis direction in the case of the positive phase difference plate, and the negative phase difference plate shows the opposite changes.

FIG. 4 is a graph showing the change in retardation of a positive phase difference plate, made of polycarbonate with coefficient K=1, with the elevation angle, measured with de Senarmont's method. The result of measurement shown in FIG. 4 agrees with the calculations and with the theoretical equations described above. (see FIGS. 3a, 3b and 3c)

Figure 5:
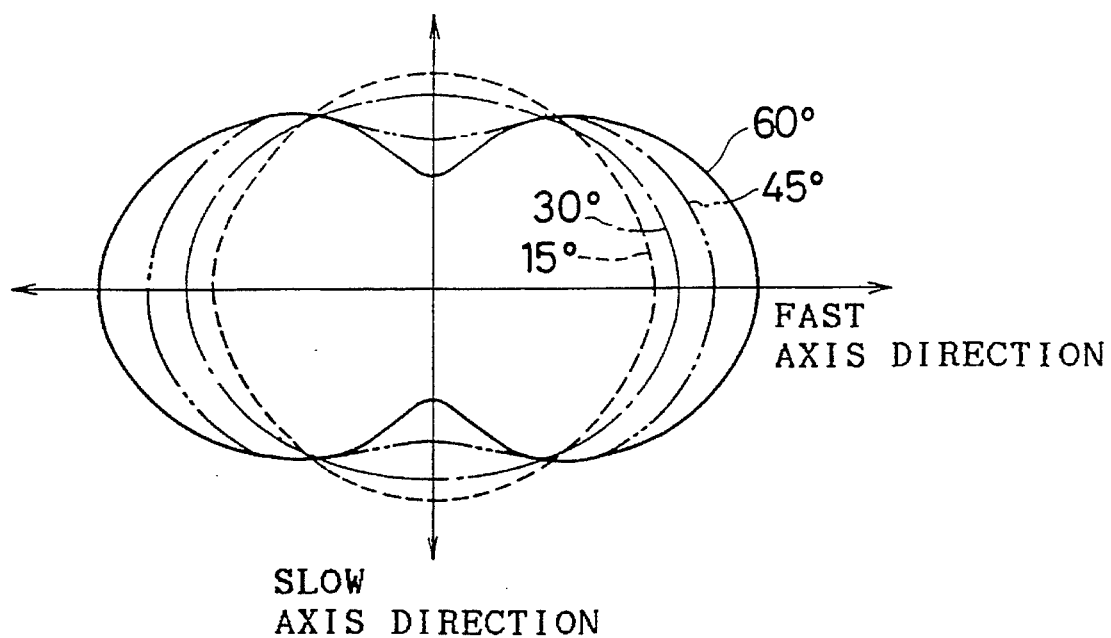
FIG. 5 is a graph showing the change in retardation of a positive phase difference plate, made of polycarbonate with coefficient K=1, with the change in azimuth for each value of elevation angle.

FIG. 5 is a graph showing the measured changes in retardation of the positive phase difference plate, made of polycarbonate, with the azimuth for each fixed value of elevation, In FIG. 5, broken line represents a case with elevation angle of 15 degrees, one dot chain line represents a case with elevation angle of 30 degrees, two dots chain line represents a case with elevation angle of 45 degrees and solid line represents a case with elevation angle of 60 degrees.

Figure 6:
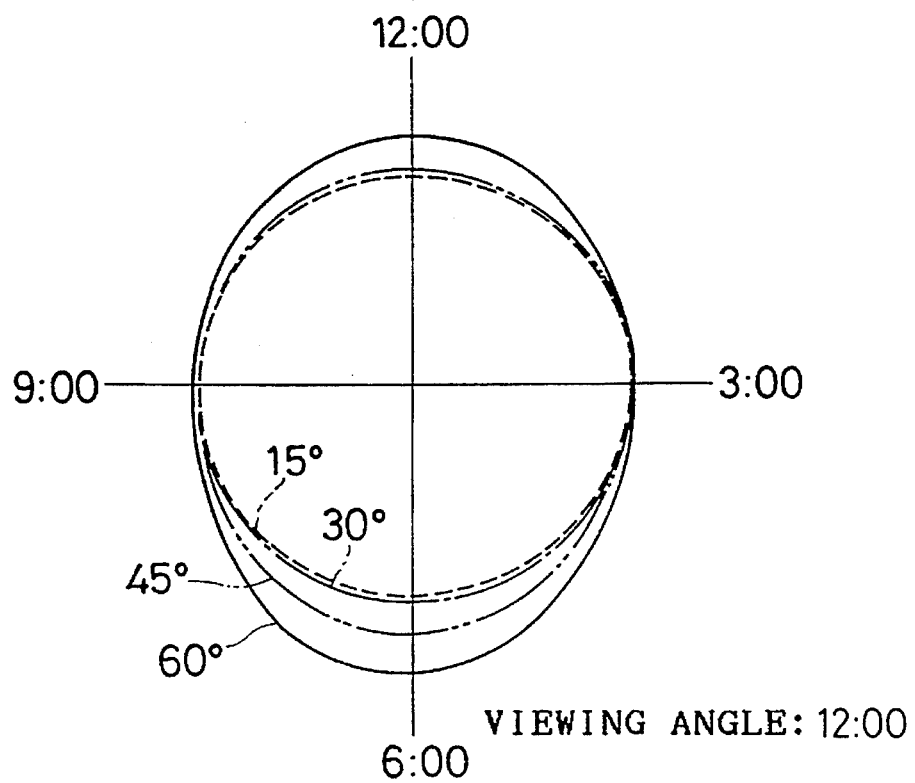
FIG. 6 is a graph showing the change in retardation of a liquid crystal display panel with the change in azimuth for each of fixed values of elevation angle.

FIG. 6 is a graph showing the measured changes in retardation of the liquid crystal display element with changes in the azimuth and elevation. In FIG. 6, broken line represents a case with elevation angle of 15 degrees, one dot chain line represents a case with elevation angle of 30 degrees, two dots chain line represents a case with elevation angle of 45 degrees and solid line represents a case with elevation angle of 60 degrees.

When a display device made by combining a phase difference plate having positive optical anisotropy of the characteristic shown in FIG. 5 and a liquid crystal display panel having the characteristic shown in FIG. 6 is viewed in an oblique direction, the relation of optical compensation collapses because both elements show different rates of retardation change, resulting in light leakage and color change. This lowers the display contrast and reduces the viewing angle. Therefore, in order to increase the viewing angle, change in retardation due to the change in elevation angle of the phase difference plate must be decreased.

Figure 7:
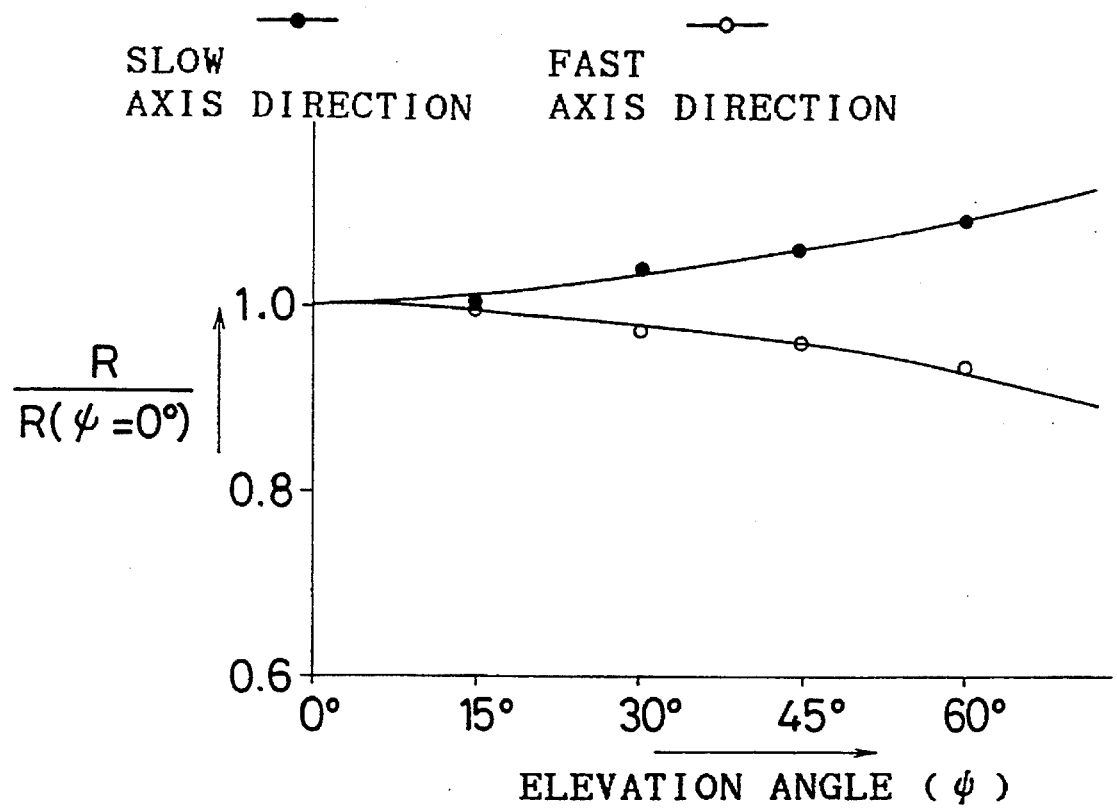
FIG. 7 is a graph showing the change in retardation of a three-dimensional phase difference plate with coefficient K=−0.57 with the change in elevation angle.

FIG. 7 is a graph showing the change in retardation (measured value) of a 3DRF (three-dimensional phase difference plate) element with coefficient K=−0.57, which changes retardation differently from that of positive phase difference plate with coefficient K=1. In a 3DRF element of coefficient K=−0.57, changes in retardation of the slow axis and fast axis directions behave reversely to that of the phase difference plate of coefficient K=1, that is, the retardation increases in the slow axis direction and decreases in the fast axis direction. It can also be seen from the graph that their rates of change are different. If this characteristic is utilized by arranging 3DRF elements so as to change the retardation with elevation angle differently from that with a phase difference plate coefficient K=1 in order to adapt to the retardation-elevation change of the liquid crystal display panel, a liquid crystal display device of less tone change and wider viewing angle can be obtained.

Figure 8:
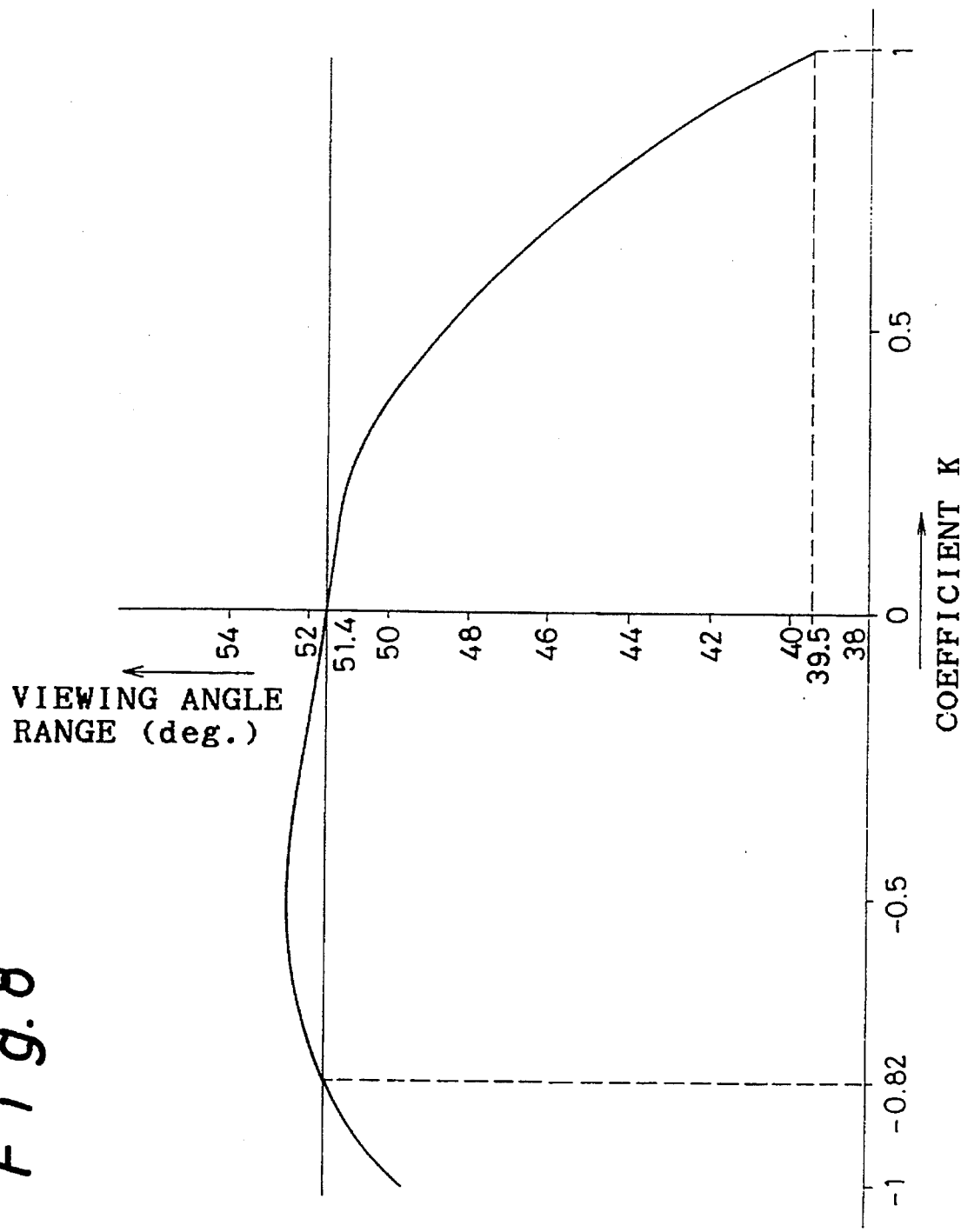
FIG. 8 is a graph showing the change in the range of viewing angles of a phase difference plate with the change in coefficient K.

Coefficient K of the uniaxially stretched polymer film in this embodiment is explained below. In an experiment conducted by the inventor of the invention, it was verified that a wide viewing angle could be obtained by using the phase difference plate 10 shown in FIG. 1 as the positive phase difference plate with coefficient K2=1. Change, observed in this case, in the range of viewing angles in 12:00–6:00 direction when the coefficient K1 of the phase difference plate 9 was changed is shown in FIG. 8. It can be seen that when the phase difference plate 9 has a coefficient K1=1, range of viewing angles where contrast is 4 or higher is 39.5 degrees, and that the range of viewing angles can be increased by 30%, making the range of viewing angles 51.4 degrees or greater, by setting the coefficient K1 as follows.

$$-0.82 \leq K1 \leq 0 \quad (15)$$

Figure 9:
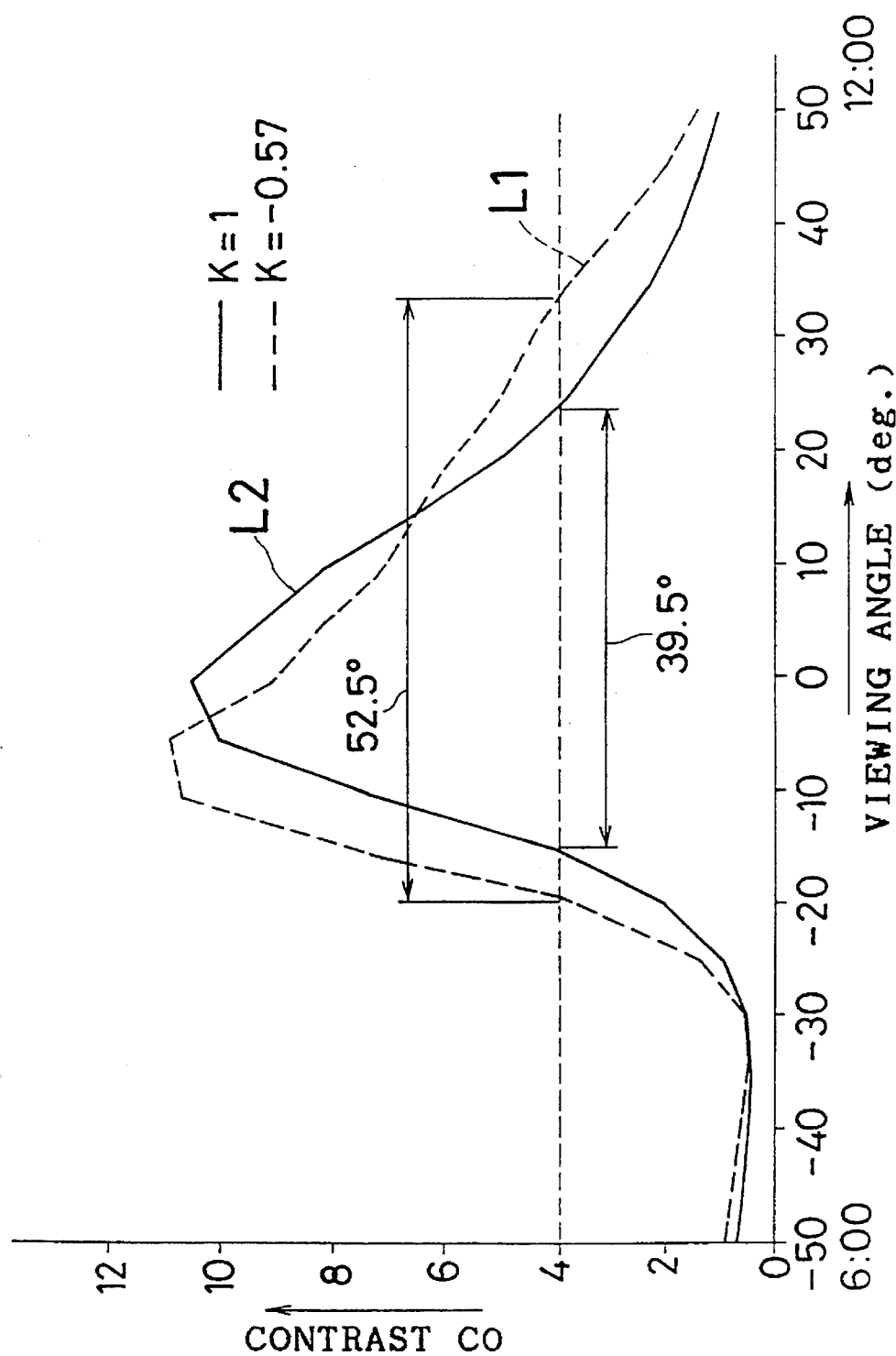
FIG. 9 is a graph showing the viewing angle characteristic in the first embodiment of the invention.

FIG. 9 is a graph showing the viewing angle characteristic of the liquid crystal display device 12. In FIG. 9, change in the contrast with the viewing angle when using phase difference plate (3DRF) 9 with coefficient K1=−0.57 and phase difference plate 10 with coefficient K2=1 is shown by broken line L1, and change in the contrast with the viewing angle when using phase difference plates 9, 10 with both coefficients being K1=K2=1 is shown by solid line L2 for comparison. The effects of improving the viewing angle with contrast Co=4 is shown by the range of viewing angles of 52.5 degrees in this embodiment, in contrast to the range of viewing angles of 39.5 degrees in the comparison case, showing an increase of the range of viewing angles by about 33%.

Second Embodiment

Description that follows is an explanation of the setting range of coefficients K1, K2 of the phase difference plates 9, 10 for increasing the range of viewing angles within which black and white of the display are not inverted, namely where the contrast Co is 1 or higher, in the arrangement shown in FIG. 1 and FIG. 2.

Figure 10:
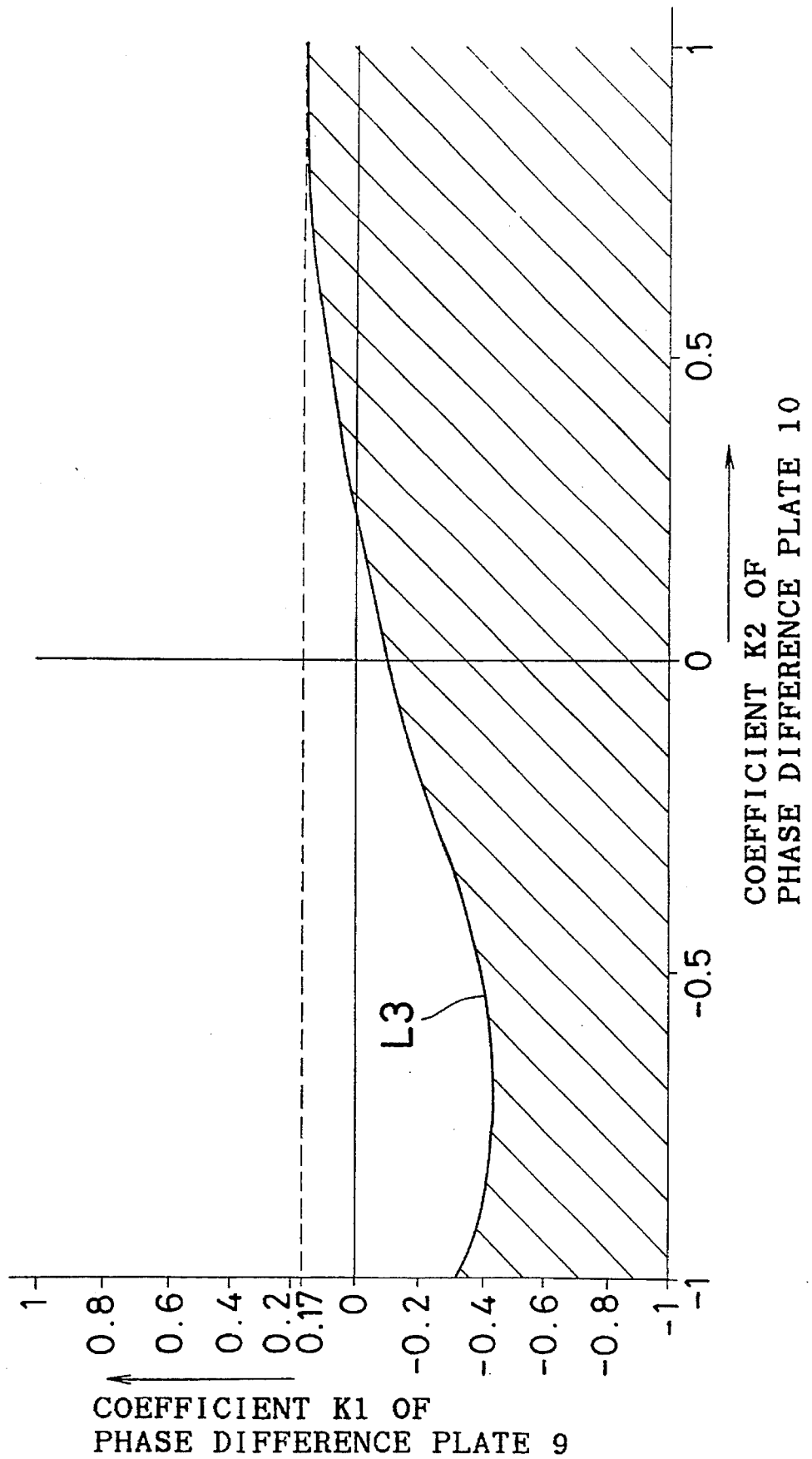
FIG. 10 is a graph explanatory of the setting ranges of coefficients K1 and K2 of the phase difference plates 9, 10 in the second embodiment of the invention.

FIG. 10 is a graph showing the change of contrast Co with the changes of coefficients K1, K2 of the phase difference plates 9, 10. In FIG. 10, solid line L3 shows the values of coefficients K1, K2 when contrast Co is 1. Shaded area of the graph shows the area where contrast Co is 1 or greater.

When a phase difference plate with coefficient K=1 is used for the phase difference plates 9, 10 of the liquid crystal display device 12 shown in FIG. 1, range of viewing angles where contrast Co is not less than 1 is 75 degrees with reference to FIG. 9. Improvement of the range of viewing angles by 20%, namely a range of viewing angles of 90 degrees or greater, can be achieved by setting the coefficients K1, K2 of the phase difference plates 9, 10 to values within the shaded region of FIG. 10.

FIG. 11 is a graph showing the viewing angle characteristic in the second embodiment. In FIG. 11, broken line L4 shows the change of contrast with viewing angle when 3DRF elements made of polycarbonate with coefficient K1=K2=−0.57 are used for the phase difference plates 9, 10. Solid line L5 shows the change of contrast with viewing angle when phase difference plates with coefficient K=1 are used for the phase difference plates 9, 10. As shown in FIG. 11. range of viewing angles of 94 degrees is obtained resulting in range of viewing angles increased by about 25% in this embodiment, compared to the range of viewing angles of 75 degrees obtained when using phase difference plates 9, 10 with coefficient K=1.

Figure 12A:
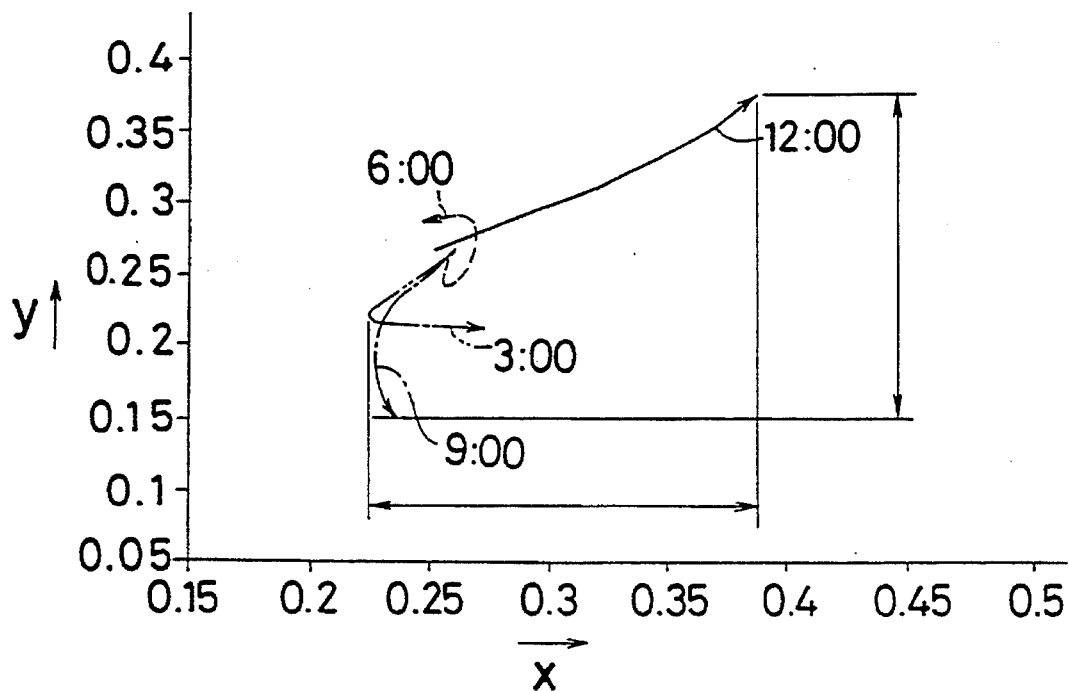
FIGS. 12a and 12b are graphs showing the color tone characteristic in the second embodiment of the invention.
Figure 12B:
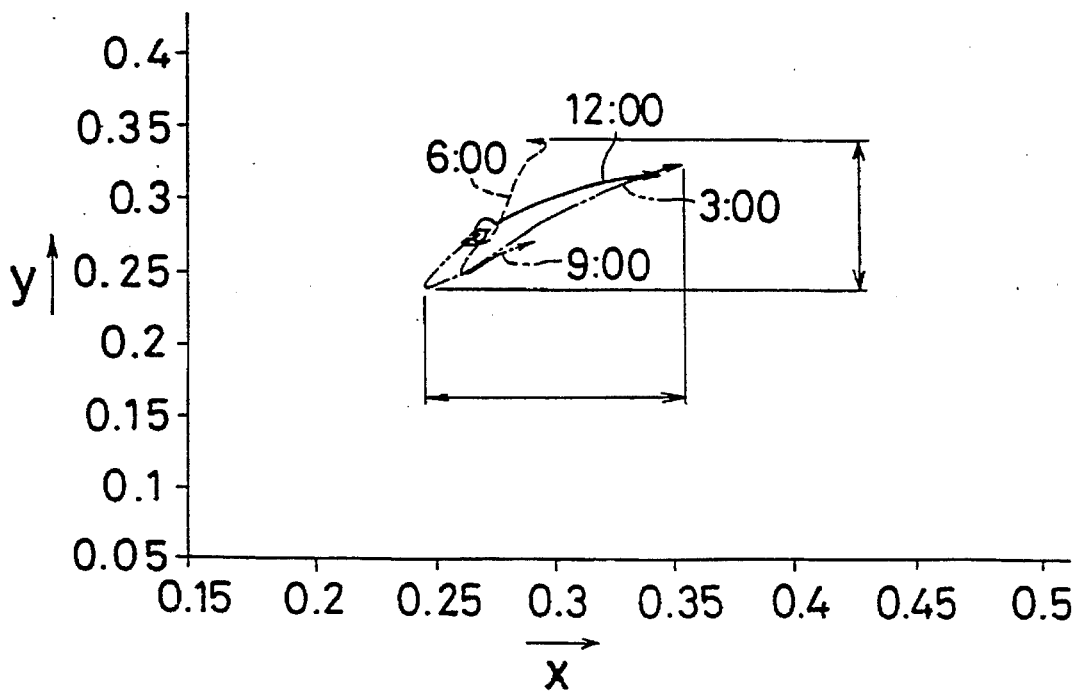

FIGS. 12a and 12b are graphs showing the color tone change in the second embodiment. FIG. 12a shows the change of color tone when using phase difference plates 9, 10 with coefficient K=1, and FIG. 12b shows the change of color tone when using phase difference plates 9, 10 with coefficients K1=K2=−0.57. Change of color tone is shown in FIGS. 12a and 12b by representing the color tone obtained when the liquid crystal display device 12 is inclined by 50 degrees from vertical position in each of four directions 12:00, 3:00, 6:00 and 9:00, in terms of CIE chromaticity chart. As shown in FIG. 12b, the color tone changes in the same sense in all four directions in the second embodiment, and the range of color tone changes is smaller when compared to FIG. 12a, thereby making it possible to obtain a liquid crystal display device of stable color tone and wide viewing angle.

Third Embodiment

Figure 13:
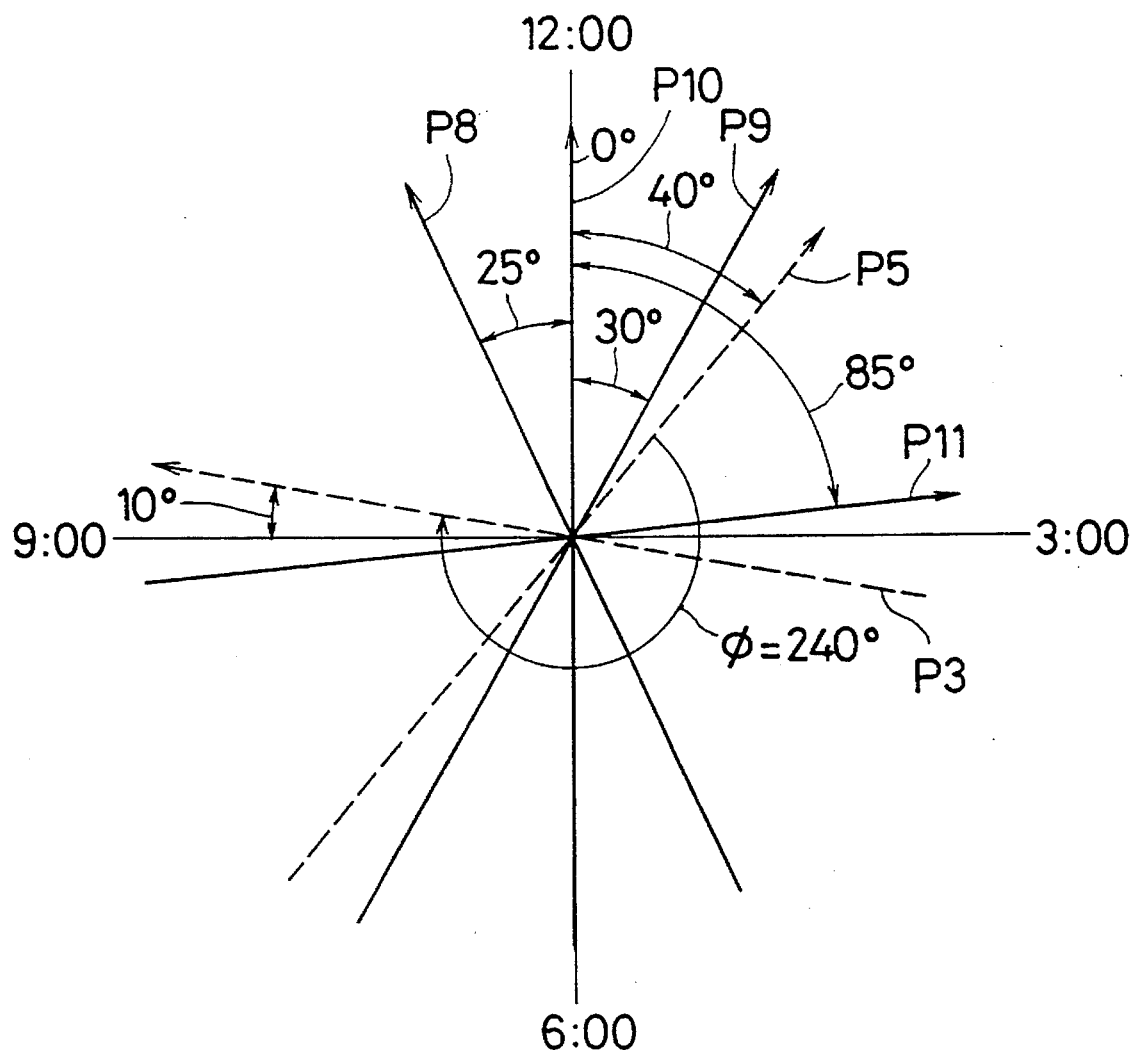
FIG. 13 is a diagram showing the conditions of disposing the members of liquid crystal display device 12 in the third embodiment of the invention.

FIG. 13 is a diagram showing another arrangement of the members of the liquid crystal display device 12 in stacked condition shown in FIG. 1. Arrow P3 indicates the direction of liquid crystal molecule orientation axis (rubbing axis) of the organic orientation film 3 formed on the glass substrate 1 which is inclined by 10 degrees from the direction of 9:00 clockwise. Arrow P5 indicates the direction of the liquid crystal molecule orientation axis of the organic orientation film 5 formed on the glass substrate 7 which is inclined by 40 degrees from the direction of 12:00 clockwise. Consequently, the liquid crystal molecules are configured in a structure twisted by 240 degrees clockwise. Directions of orientation P3, P5 of the organic orientation films 3, 5 are the same as those shown in FIG. 2.

Arrow P8 indicates the absorption axis direction of the polarizer plate 8 which is inclined by 25 degrees from the direction of 12:00 counterclockwise. Arrow P11 indicates the absorption axis direction of the polarizer plate 11 which is inclined by 85 degrees from the direction of 12:00 clockwise.

Arrow P9 indicates the slow axis direction of the phase difference plate 9 which is inclined by 30 degrees from the direction of 12:00 clockwise. Arrow P10 indicates the slow axis direction of the phase difference plate 10 which corresponds to the direction of 12:00.

Figure 14:
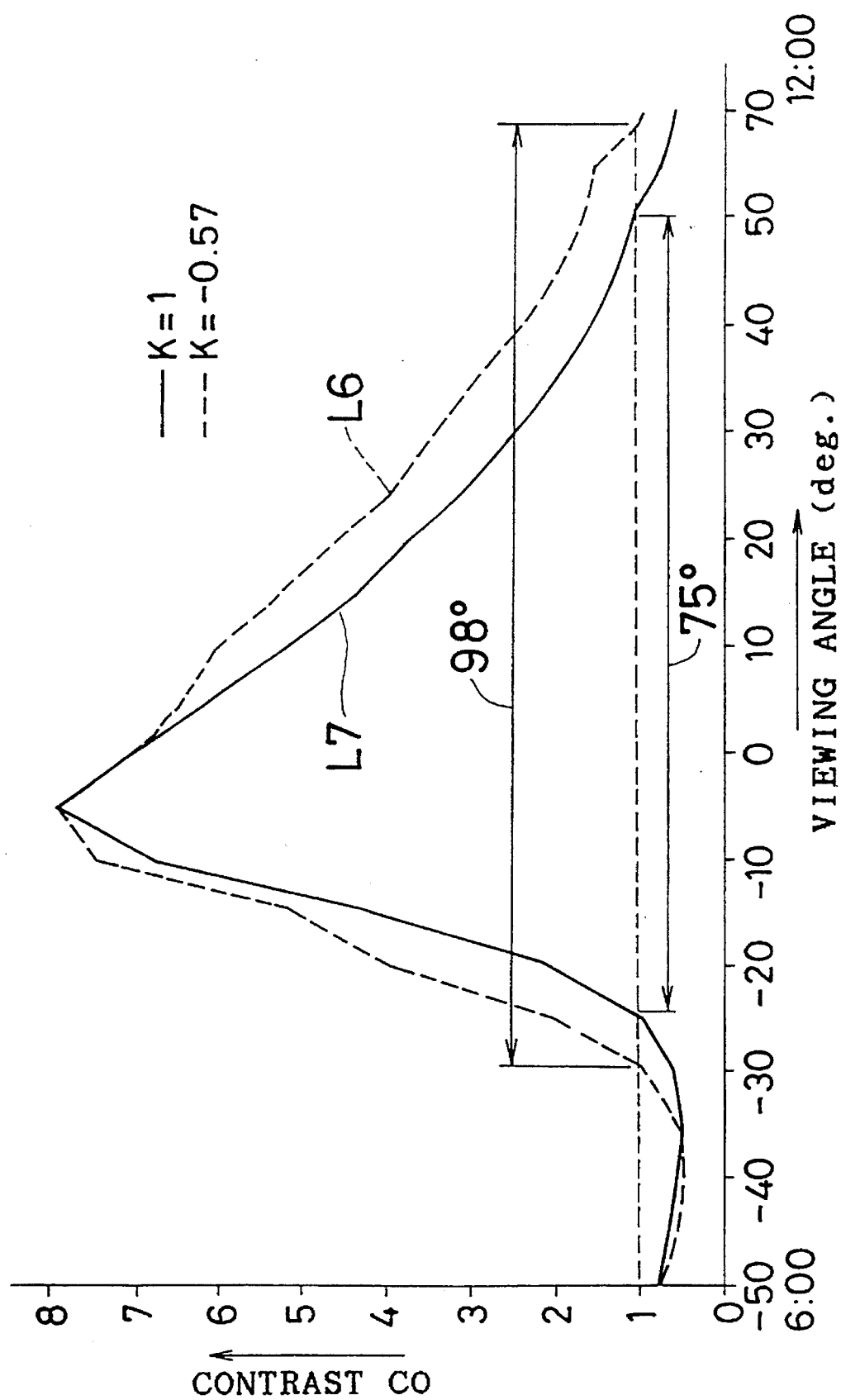
FIG. 14 is a graph showing the viewing angle characteristic in the third embodiment of the invention.

FIG. 14 is a graph showing the viewing angle characteristic in the third embodiment. In FIG. 14 change in contrast with viewing angle when 3DRF (three-dimensional phase difference plate) elements made of polycarbonate with coefficient K1=K2=−0.57 are used for the phase difference plates 9, 10 is indicated by broken line L6. Change in contrast with viewing angle when phase difference plate with coefficient K1=K2=1 is used for the phase difference plates 9, 10 is indicated by solid line L7 as an example for comparison. As shown in FIG. 14, range of viewing angles where contrast Co is not less than 1 is 98 degrees resulting in range of viewing angles increased by about 30% in this embodiment, compared to the range of viewing angle where contrast Co is not less than 1 is 98 degrees when using phase difference plates 9, 10 with coefficient K=1.

Figure 15A:
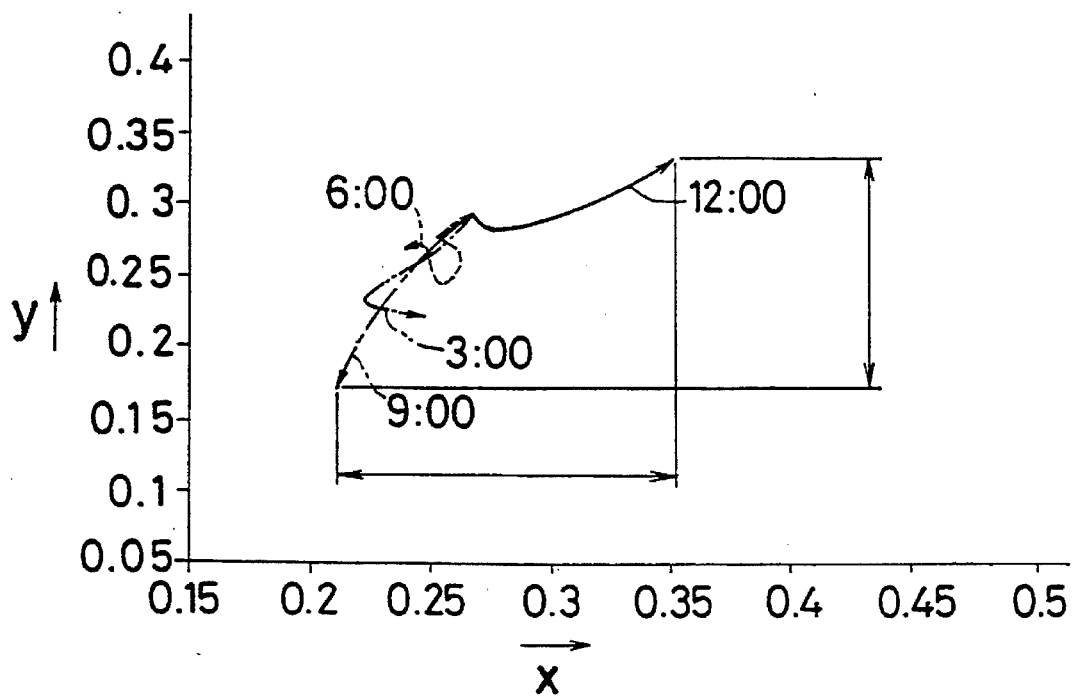
FIGS. 15a and 15b are graphs showing the change in color tone in the third embodiment of the invention.
Figure 15B:
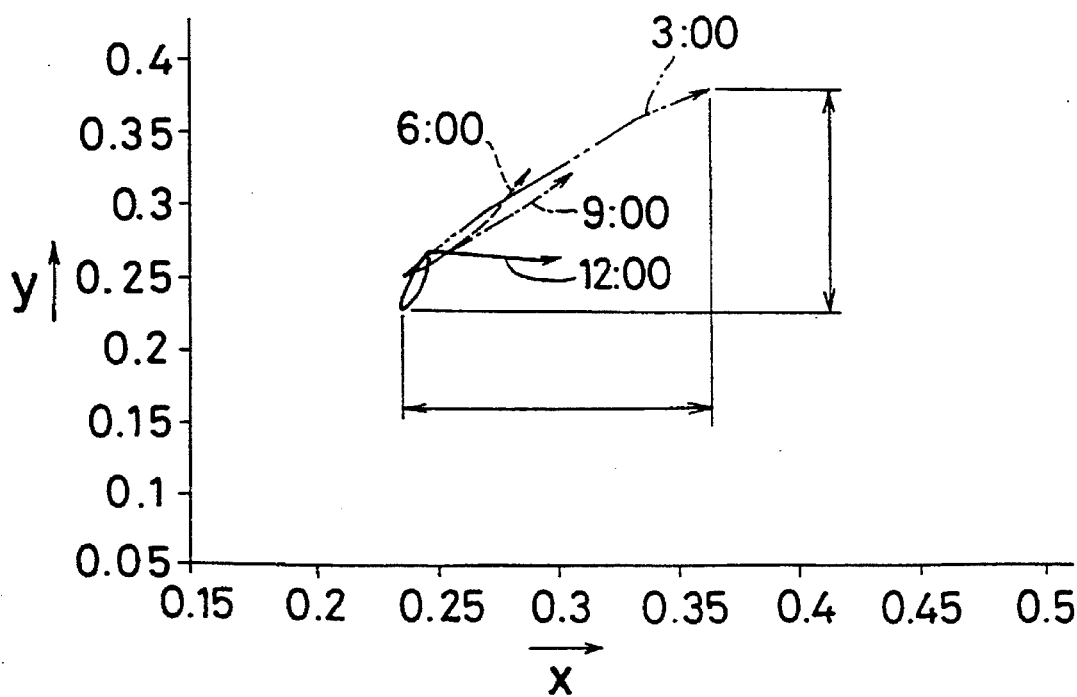

FIGS. 15a and 15b are graphs showing the color tone change in the third embodiment. FIG. 15a shows the change of color tone when using phase difference plates 9, 10 with coefficients K1=K2=1, and FIG. 15b shows the change of color tone when using phase difference plates 9, 10 with coefficients K1=K2=−0.57. Change of color tone is shown by representing the color tone obtained when the liquid crystal display device 12 is inclined by 50 degrees from vertical position in each of four directions 12:00, 3:00, 6:00 and 9:00, in terms of CIE chromaticity chart. As shown in FIG. 15b, color tone changes in the same sense in all four directions in the third embodiment, and the range of color tone changes is smaller when compared to FIG. 15a, thereby making it possible to obtain a liquid crystal display device of stable color tone and wide viewing angle.

Fourth Embodiment

Figure 16:
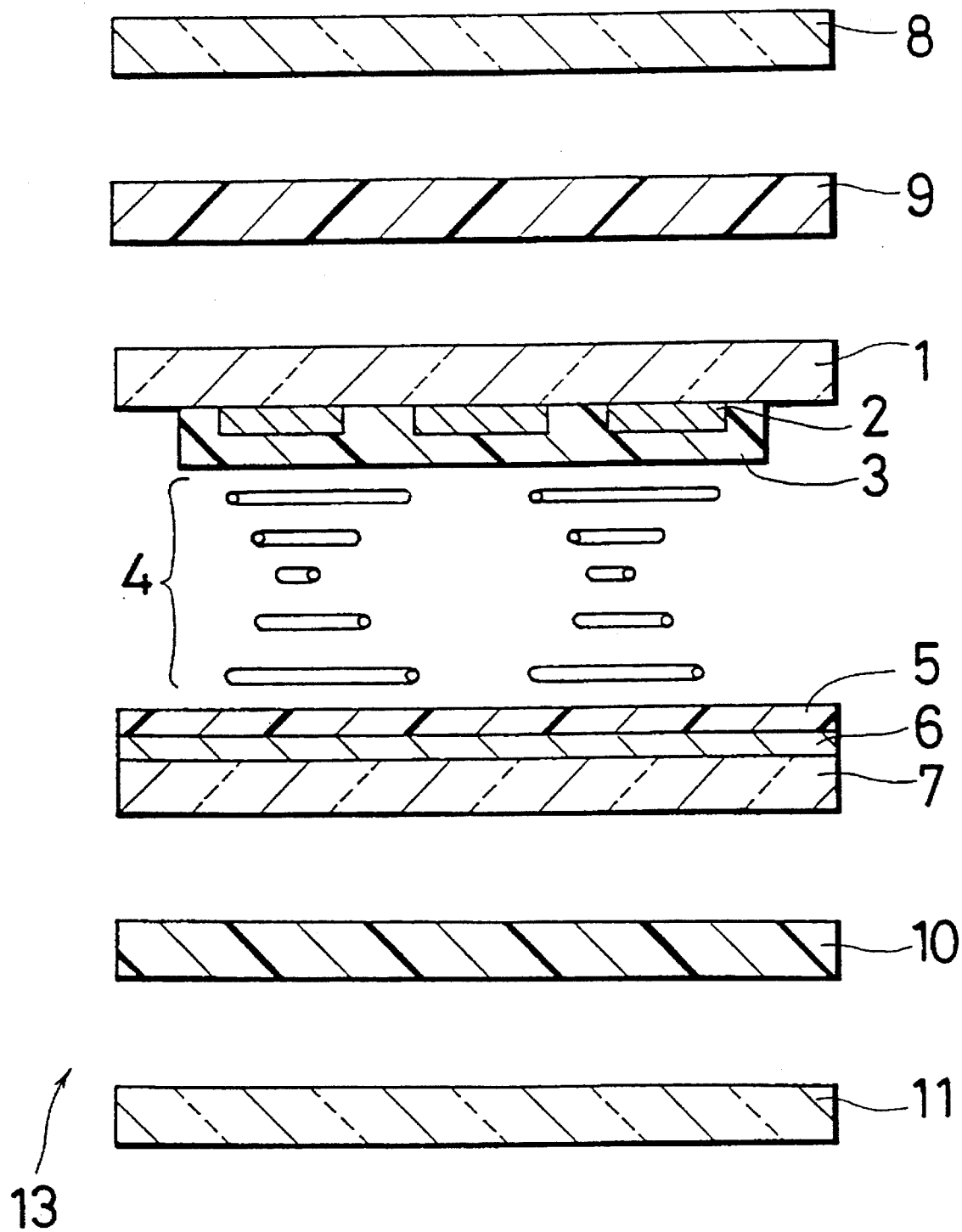
FIG. 16 is an exploded sectional view showing the constitution of the liquid crystal display device 12 of the fourth embodiment of the invention.

FIG. 16 shows an exploded sectional view of a liquid crystal display device 13 in the fourth embodiment of the invention. This embodiment is similar to the liquid crystal display device 12 shown in FIG. 1, and the same reference numbers are given to the same components. This embodiment is characterized by the fact that phase difference plates 9, 10 made of polycarbonate both having retardation of 420 nm are arranged between the glass substrate 1 and the polarizer plate 8 and between the glass substrate 7 and the polarizer plate 11, respectively, and the mixed liquid crystal interposed between the substrates has a refractive anisotropy Δn=0.123. Other members are the same as those of the liquid crystal display device 12.

The liquid crystal display device 13 thus consists of the polarizer plate 8, the phase difference plate 9, the liquid crystal display panel, the phase difference plate 10 and the polarizer plate 11 which are stacked on each other in this order.

Figure 17:
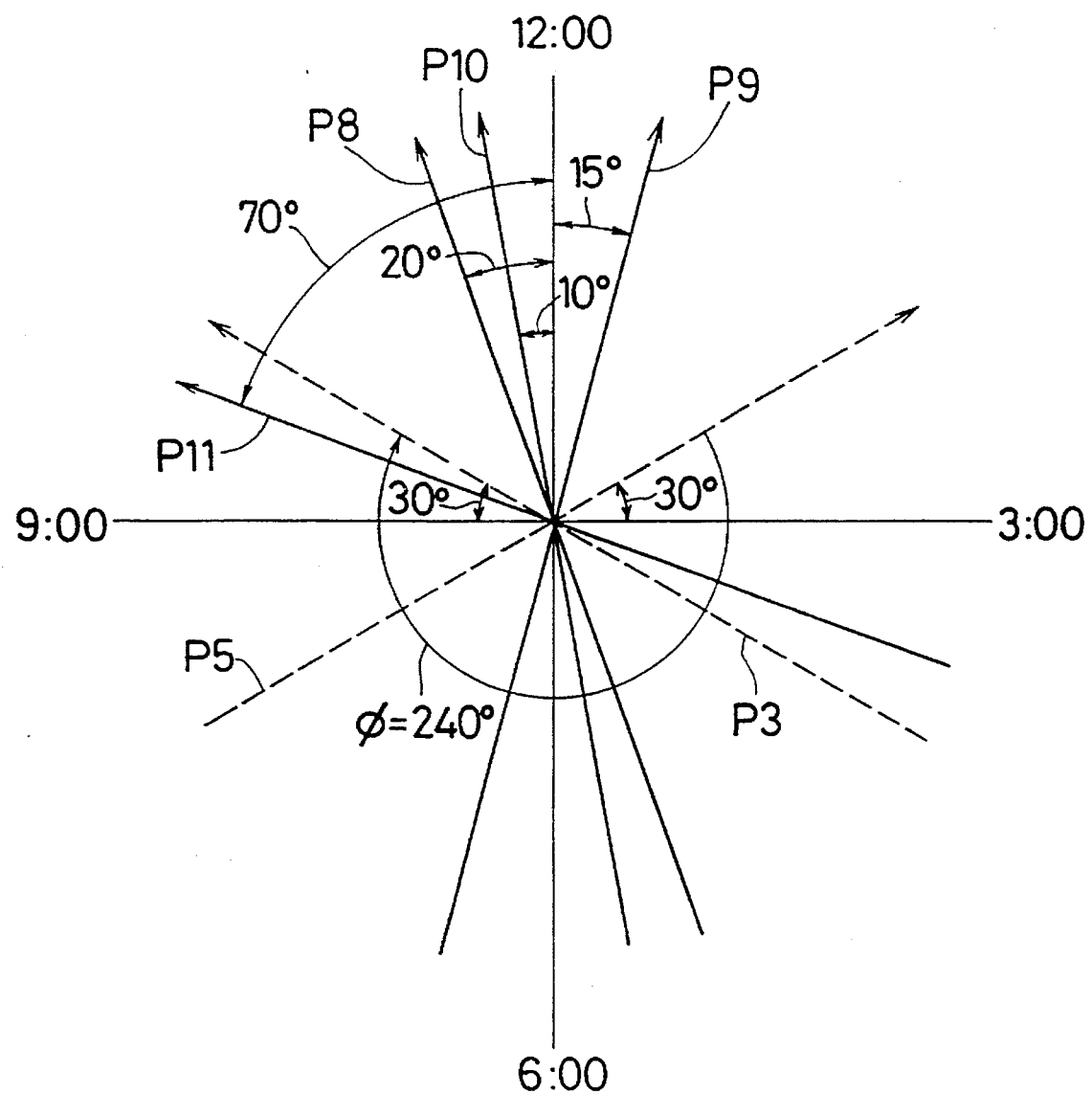
FIG. 17 is a diagram showing the conditions of disposing the members of liquid crystal display device 13 in the fourth embodiment of the invention.

FIG. 17 is a diagram showing the orientation of the members of the liquid crystal display device 13 of the fourth embodiment. Arrow P3 indicates the direction of liquid crystal molecule orientation axis (rubbing axis) of the organic orientation film 3 formed on the glass substrate 1 which is inclined by 30 degrees from the direction of 9:00 clockwise. Arrow P5 indicates the direction of liquid crystal molecule orientation axis of the organic orientation film 5 formed on the glass substrate 7 which is inclined by 30 degrees from the direction of 3:00 counterclockwise. Consequently, the liquid crystal molecules are configured in a structure twisted by 240 degrees clockwise.

Arrow P8 indicates the absorption axis direction of the polarizer plate 8 which is inclined by 20 degrees from the direction of 12:00 counterclockwise. Arrow P11 indicates the absorption axis direction of the polarizer plate 11 which is inclined by 70 degrees from the direction of 12:00 counterclockwise.

Arrow P9 indicates the slow axis direction of the phase difference plate 9 which is inclined by 15 degrees from the direction of 12:00 clockwise. Arrow P10 indicates the slow axis direction of the phase difference plate 10 which is inclined by 10 degrees from the direction of 12:00 counterclockwise.

Figure 18:
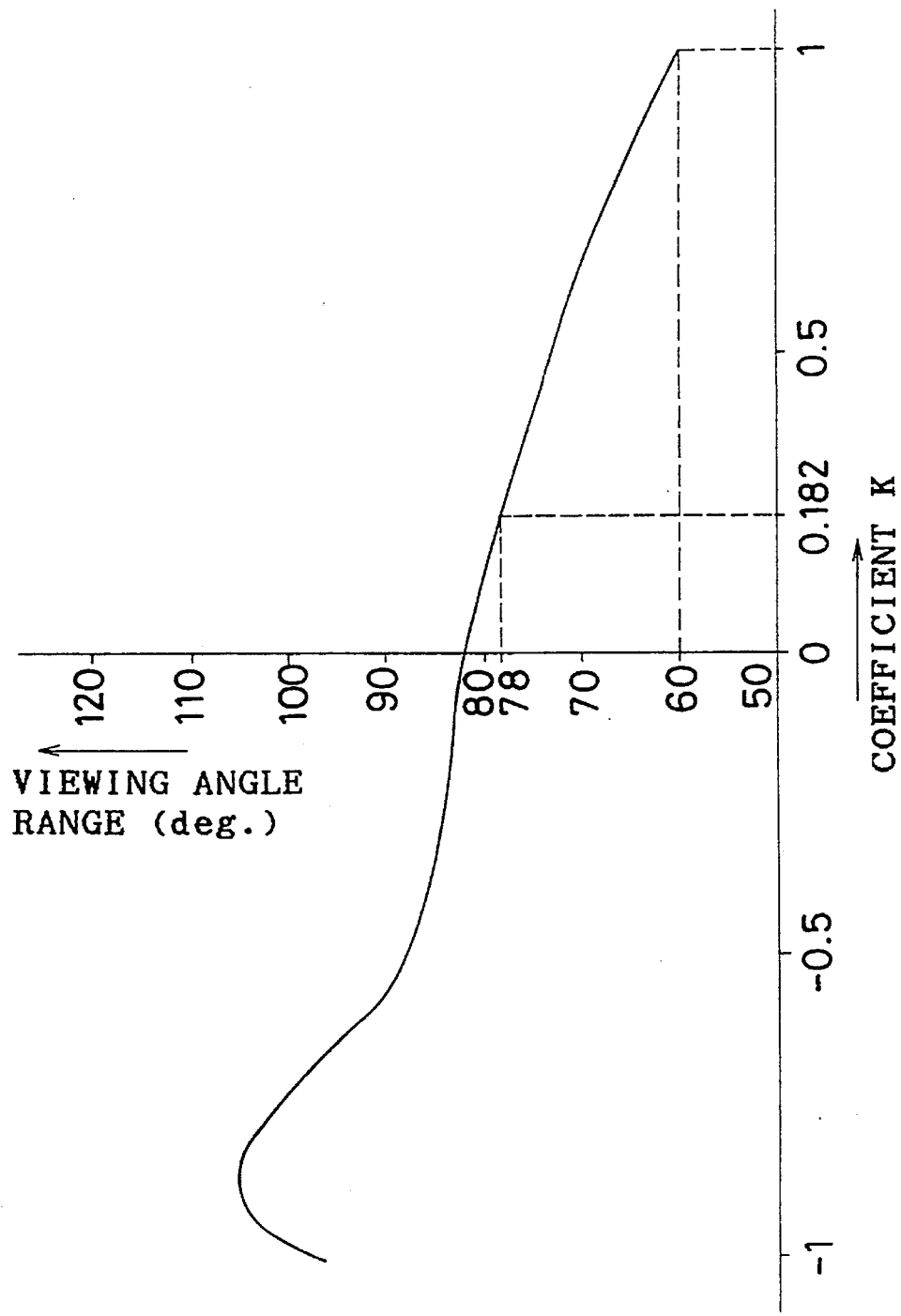
FIG. 18 is a graph explanatory of the setting ranges of coefficients K1 and K2 of the phase difference plates 9, 10 in the fourth embodiment of the invention.

FIG. 18 shows the range of viewing angles in the direction 12:00–6:00 where contrast Co is not less than 1 and coefficient K of the phase difference plates 9, 10 is changed in the liquid crystal display device 13 shown in FIG. 16 and FIG. 17. When both coefficients K1 and K2 of the phase difference plates 9, 10 are made equal to 1, range of viewing angles where contrast is not less than 1 is 60 degrees. This range of viewing angles can be increased by 30% to at least 78 degrees by setting the coefficients K1 and K2 as follows as can be seen from FIG. 18.

$$-1 \leq K1.K2 \leq 0.182 \tag{16}$$

Figure 19:
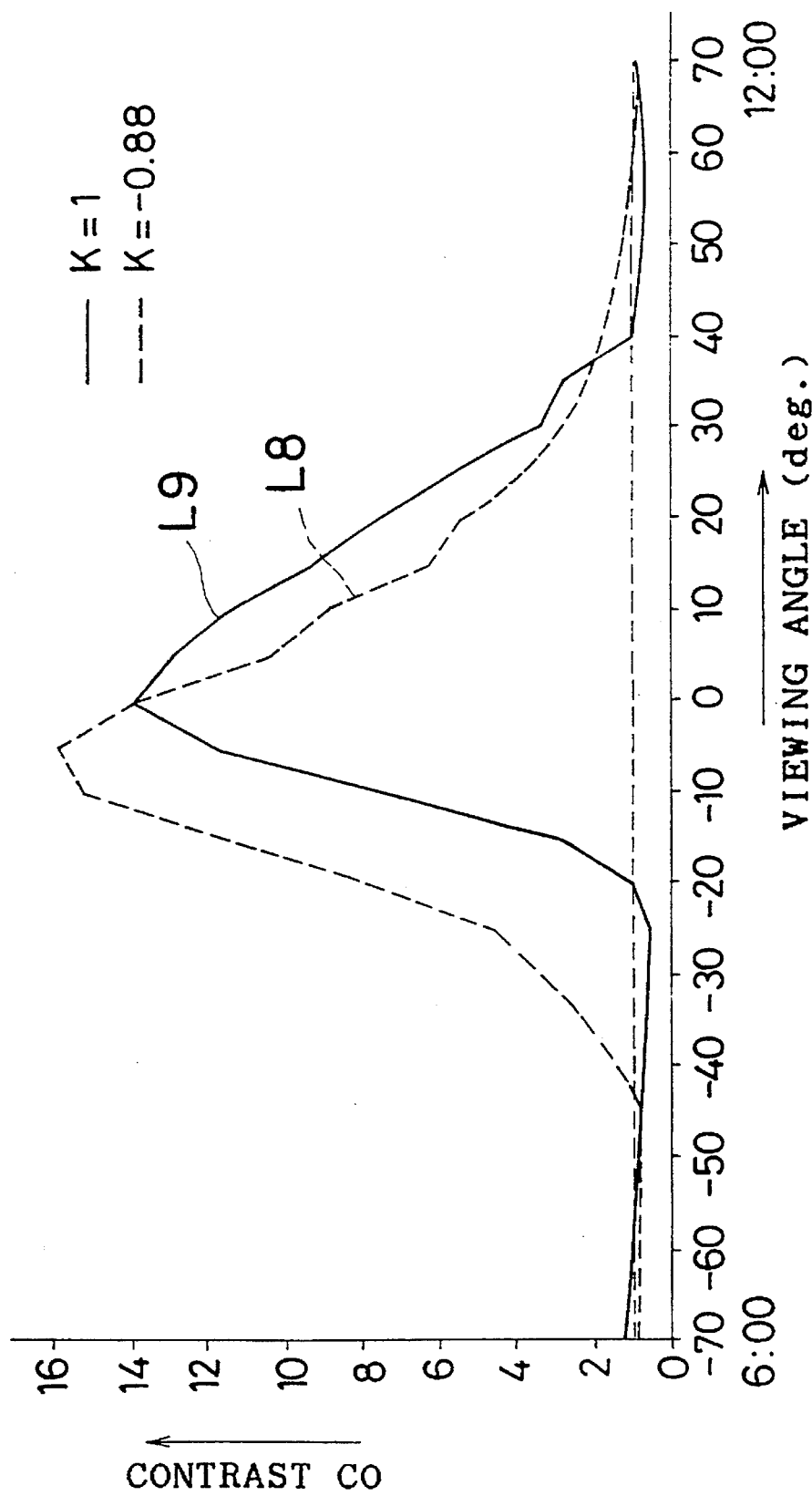
FIG. 19 is a graph showing the viewing angle characteristic in the fourth embodiment of the invention.

FIG. 19 is a graph showing the viewing angle characteristic in the fourth embodiment. In FIG. 19, change of contrast with viewing angle in the direction 12:00–6:00 is shown. Broken line L8 indicates the contrast change when 3DRF (three-dimensional phase difference plate) elements with coefficient K1=K2=−0.88 are used for the phase difference plates 9, 10. Solid line L9 indicates the change of contrast when phase difference plate with coefficient K1=K2=1 are used for the phase difference plates 9, 10. As can be seen from FIG. 19, the region where black and white of the display are not inverted, namely the range of viewing angles where contrast Co is not less than 1, is 60 degrees in the case of phase difference plates with coefficients K1=K2=1, while it is 105 degrees in the liquid crystal display device 13 of the fourth embodiment which is greater by about 75%.

Figure 20A:
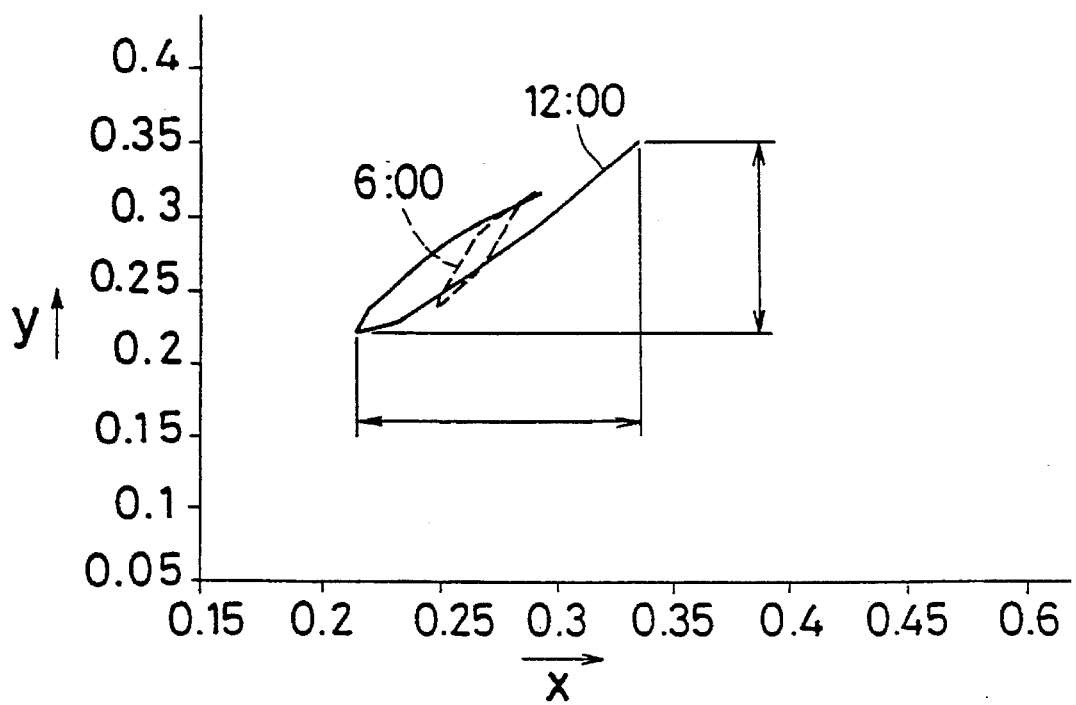
FIGS. 20a and 20b are graphs showing the color tone characteristic in the fourth embodiment of the invention.
Figure 20B:
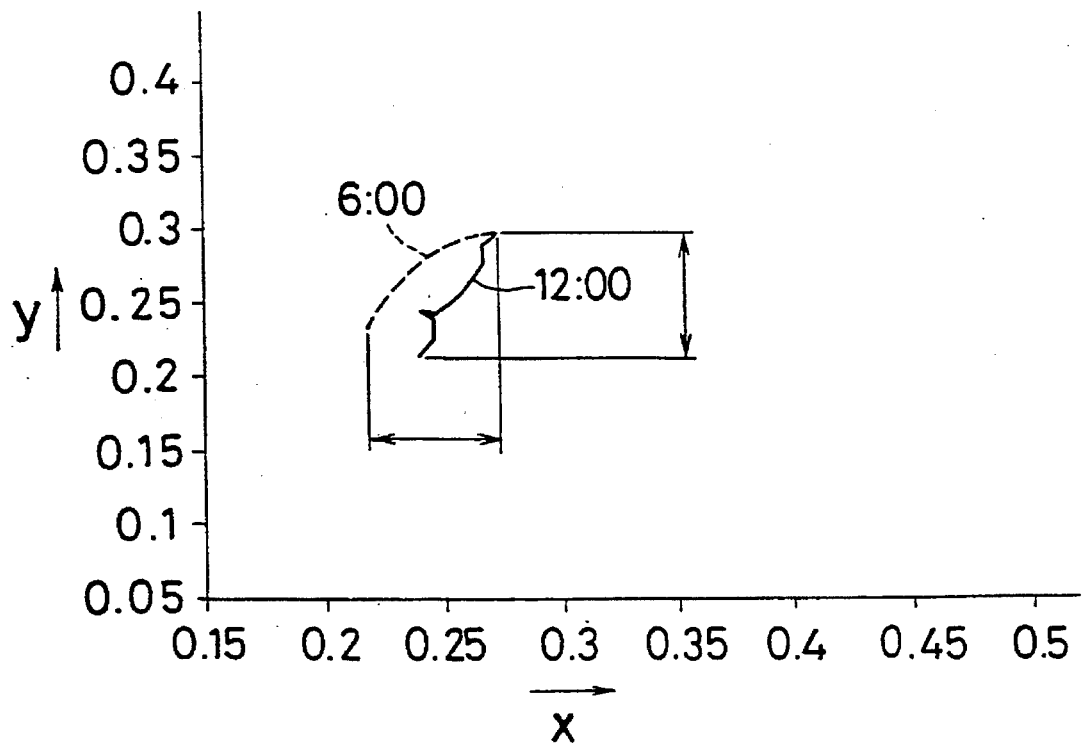

FIGS. 20a and 20b are graphs showing the color tone change in fourth embodiment. FIG. 20a shows the change of color tone when using phase difference plates 9, 10 with coefficient K1=K2=1, and FIG. 20b shows the change of color tone when using phase difference plates 9, 10 with coefficients K1=K2=−0.88. Change of color tone is shown by representing the color tone obtained when the liquid crystal display device 13 is inclined by 50 degrees from vertical position in each of two directions 12:00 and 6:00 with reference to CIE chromaticity chart. As shown in FIG. 20b, color tone changes are in the same sense in the two directions in the fourth embodiment, and the range of color tone changes is smaller when compared to FIG. 20a, thereby making it possible to obtain a liquid crystal display device of stable color tone and wide viewing angle.

Fifth Embodiment

Description that follows is an explanation of the setting range of coefficients K1, K2 of the phase difference plates 9, 10 in case of increasing the range of viewing angles of the region where contrast Co is not less than 4, in the liquid crystal display device 13 shown in FIG. 16 and FIG. 17.

Figure 21:
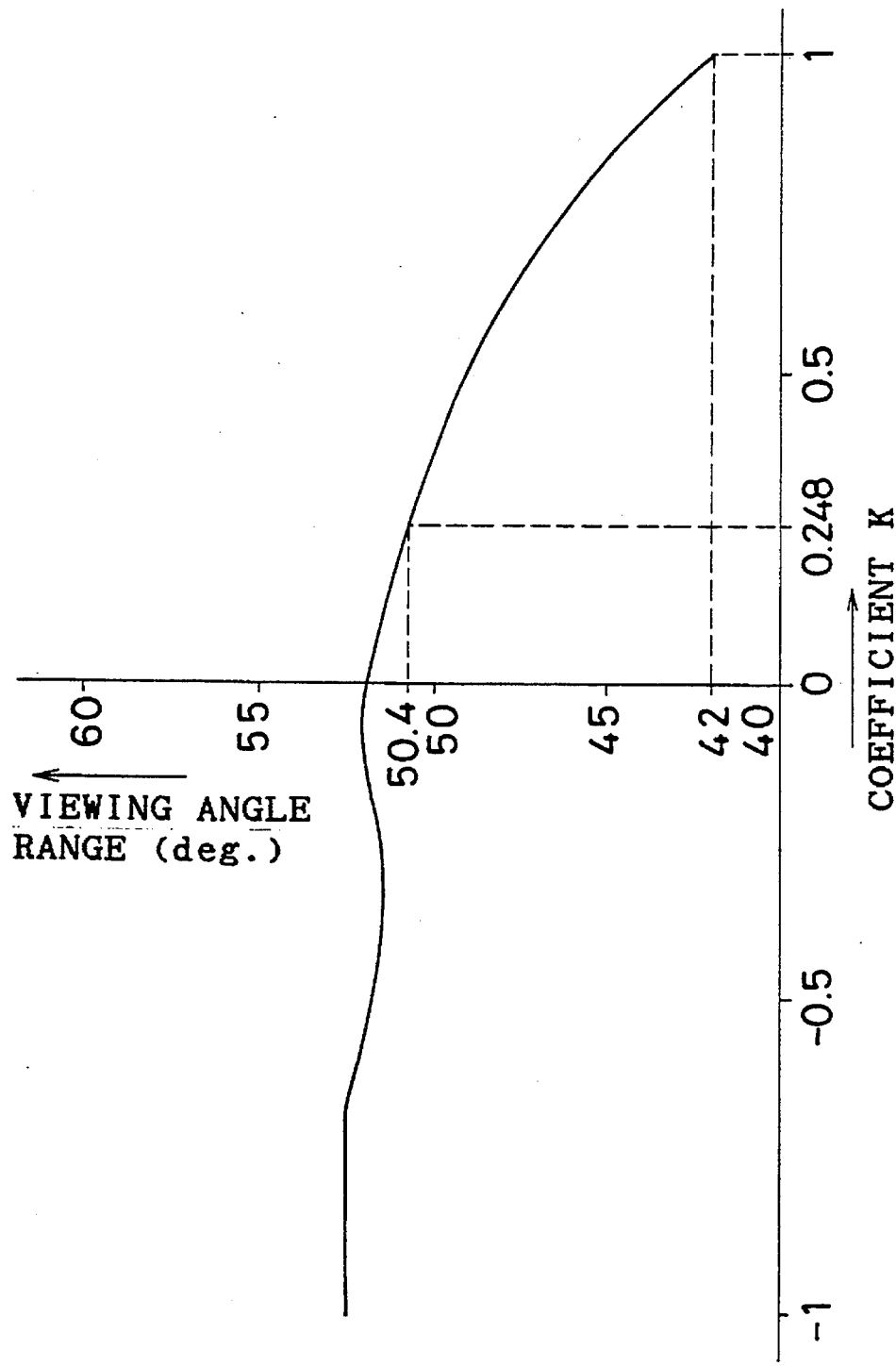
FIG. 21 is a graph explanatory of the setting ranges of coefficients K1 and K2 of the phase difference plates 9, 10 in the liquid crystal display device 13 in the fifth embodiment of the invention.

FIG. 21 shows the range of viewing angles in the direction 12:00–6:00 where contrast Co is not less than 4 and coefficient K of the phase difference plates 9, 10 is changed in the liquid crystal display device 13. When both coefficients K1 and K2 of the phase difference plates 9, 10 are made equal to 1, range of viewing angles where contrast is not less than 4 is 42 degrees. This range of viewing angles can be increased by 20% to at least 50.4 degrees by setting the coefficients K1 and K2 as follows as can be seen from FIG. 21.

$$-1 \leq K1.K2 \leq 0.248 \quad (17)$$

Figure 22:
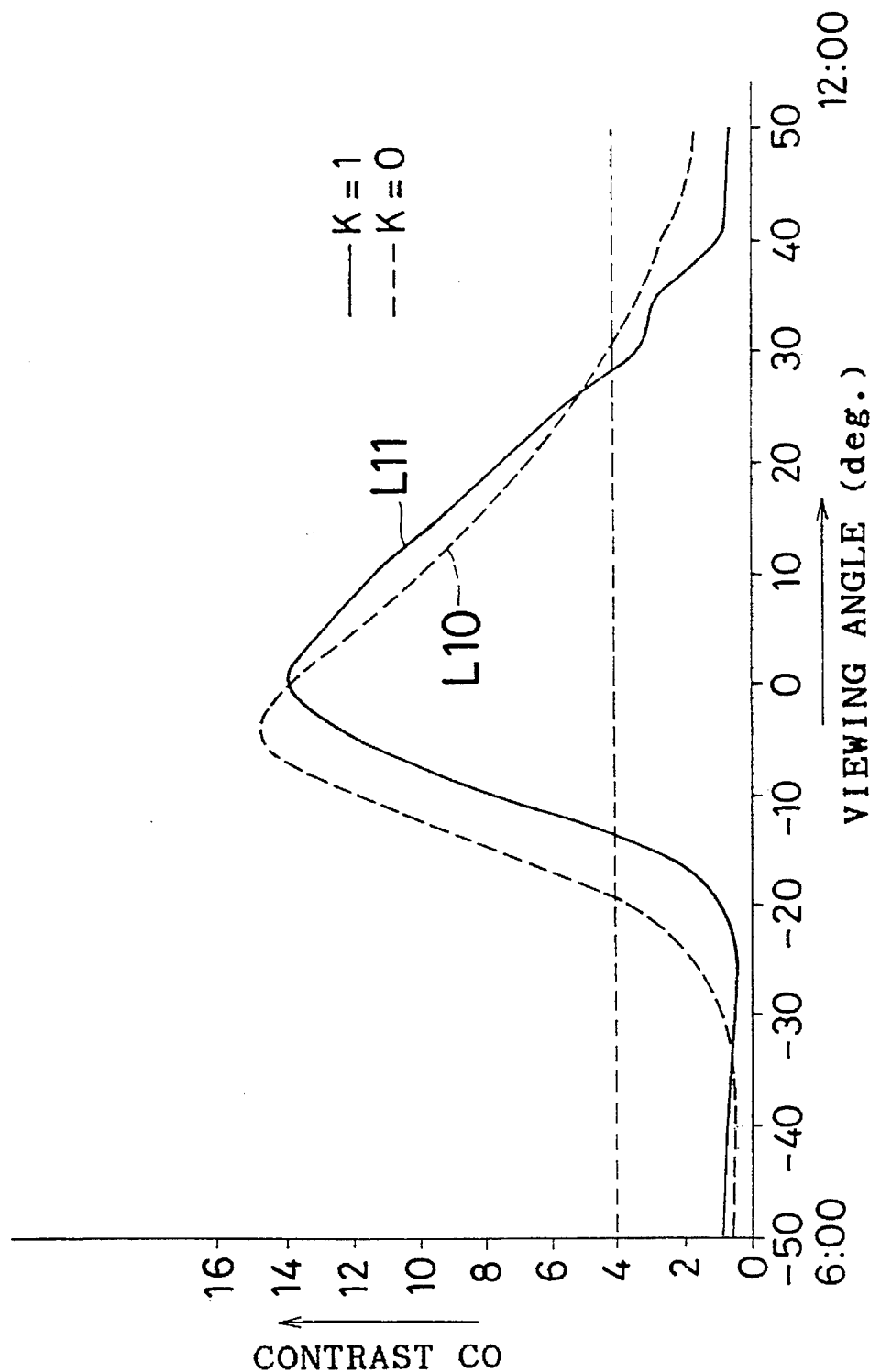
FIG. 22 is a graph showing the viewing angle characteristic in the fifth embodiment of the invention.

FIG. 22 is a graph showing the viewing angle characteristic in the fifth embodiment. In FIG. 22, change of contrast with viewing angle in the direction 12:00–6:00 of the liquid crystal display device 13 is shown. Broken line L10 indicates the contrast change when 3DRF (three-dimensional phase difference plate) elements with coefficient K1=K2=0 are used for the phase difference plates 9, 10. Solid line L11 indicates the change of contrast when phase difference plates with coefficient K1=K2=1 are used for the phase difference plates 9, 10. As can be seen from FIG. 22, the range of viewing angles where contrast Co is not less than 4 is 42 degrees in the case of coefficients K1=K2=1, while it is 52.5 degrees in the liquid crystal display device 13 of the fifth embodiment which is greater by about 25%.

Figure 23A:
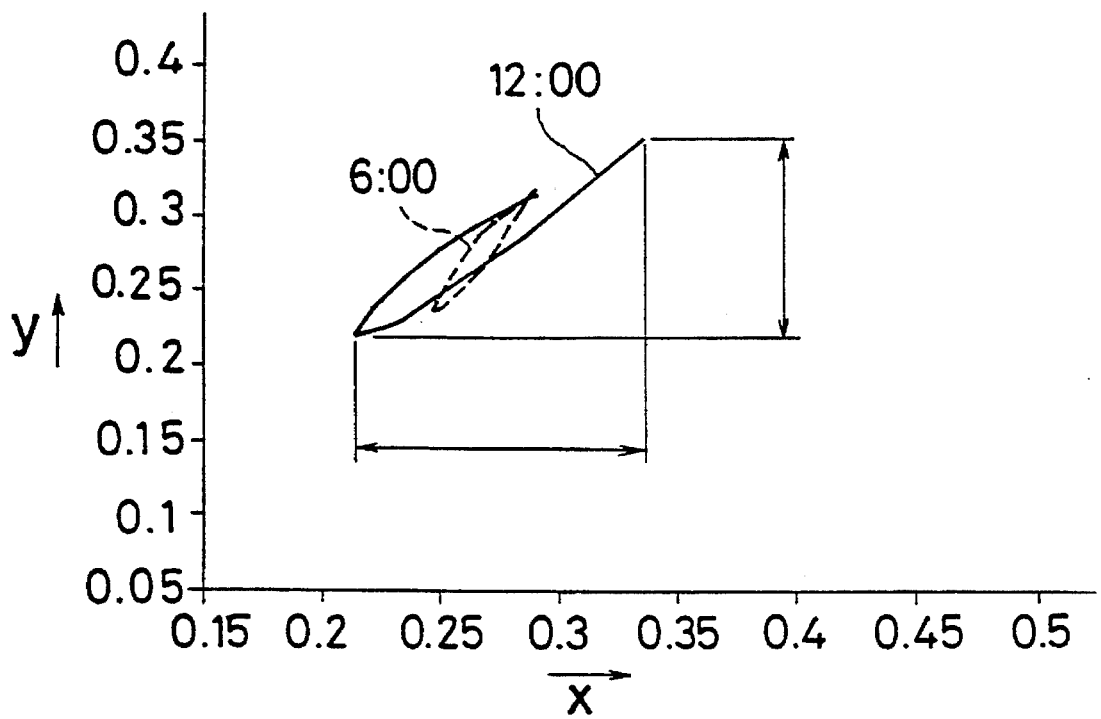
FIGS. 23a and 23b are graphs showing the color tone characteristic in the fifth embodiment of the invention.
Figure 23B:
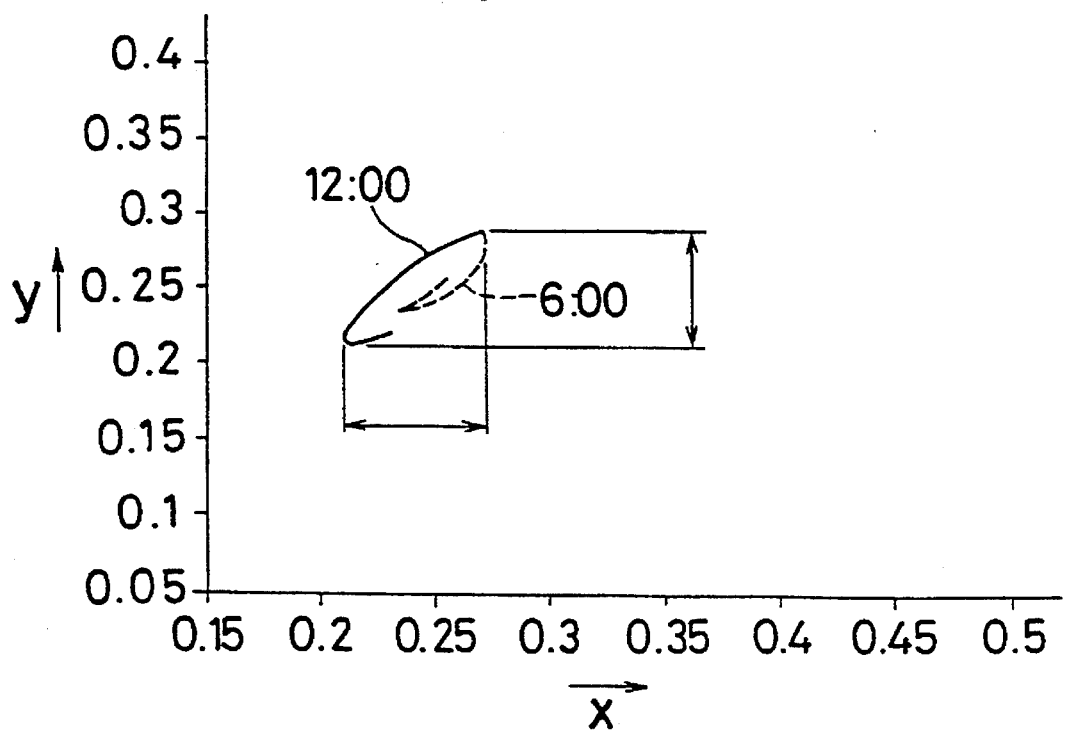

FIGS. 23a and 23b are graphs showing the color tone change in the fifth embodiment. FIG. 23a shows the change of color tone when using phase difference plates 9, 10 with coefficient K1=K2=1, and FIG. 23b shows the change of color tone when using phase difference plates 9, 10 with coefficients K1=K2=0. Change of color tone is shown by representing the color tone obtained when the liquid crystal display device 13 is inclined by 50 degrees from vertical position in each of two directions 12:00 and 6:00 with reference to CIE chromaticity chart. As shown in FIG. 23b, color tone changes are in the same sense in the two directions in the fifth embodiment, and the range of color tone changes is smaller when compared to FIG. 23 a, thereby making it possible to obtain a liquid crystal display device of stable color tone and wide viewing angle.

In embodiments 1 through 5, as described above, changes of retardation with the elevation angle of the arrangement of phase difference plates and the liquid crystal display panel are made equal by using 3DRF (three-dimensional phase difference plates) which change retardation with the elevation angle differently from the conventional one with coefficient K=1. This solves the problems of the conventional black and white liquid crystal display device of phase difference plate type such as change in color tone and narrow viewing angle due to the inversion of black and white, to make it possible to produce black and white liquid crystal display devices of high contrast ratio and a wide viewing angle, which are suitable for large display devices of high resolutions such as 1280×980 dots and 1120×800 dots being applicable to workstations. Because the black and white display is made stable, the invention minimizes the change of display color with the viewing angle even in the case of color display, thereby greatly improving the display quality.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed is:

1. A liquid crystal display device comprising a first polarizer plate, a first optical compensation plate formed by a uniaxially stretched polymer film, a second optical compensation plate formed by a uniaxially stretched polymer film, a supertwisted nematic type liquid crystal display panel and a second polarizer plate which are stacked in the foregoing order, wherein:

the uniaxially stretched polymer films exhibit anisotropic optical properties defined by mutually orthogonal refractive indices denoted X and Y in directions parallel to the film plane and Z in a direction normal to the film plane;

a coefficient K, denoting the rate of retardation change of light viewed through the film as the inclination of the viewing direction changes, is determined by (a) K=1−(Z−Y)/(X−Z) when (X+Y)/2>Z and X≠Z
(b) K=(X−Z)/(Z−Y)−1 when (X+Y)/2<Z and Z≠Y
(c) K=0 when (X+Y)/2=Z; and coefficients K1 and K2 of the uniaxially stretched polymer films forming the first and second optical compensation plates, respectively, are set in the range of $$-1 \leq K1 \leq 0.17 \text{ and } 0 \leq K2 \leq 1.$$

2. A liquid crystal display device comprising a first polarizer plate, a first optical compensation plate formed by a uniaxially stretched polymer film, a second optical compensation plate formed by a uniaxially stretched polymer film, a supertwisted nematic type liquid crystal display panel and a second polarizer plate which are stacked in the foregoing order with no additional optical elements interposed between the first polarizer plate and the liquid crystal display panel, wherein:

the uniaxially stretched polymer films exhibit anisotropic optical properties defined by mutually orthogonal refractive indices denoted X and Y along slow and fast axes, respectively, parallel to the film plane and Z along an axis normal to the film plane;

the slow axes of the first and second optical compensation plates are angularly displaced from each other by about 30°;

a coefficient K, denoting the rate of retardation change of light viewed through the film as the inclination of the viewing direction changes, is determined by (a) $K=1-(Z-Y)/(X-Z)$ when $(X+Y)/2>Z$ and $X \neq Z$ (b) $K=(X-Z)/(Z-Y)-1$ when $(X+Y)/2<Z$ and $Z \neq Y$ (c) $K=0$ when $(X+Y)/2=Z$; and coefficients K1 and K2 of the uniaxially stretched polymer films forming the first and second optical compensation plates, respectively, are set in the range of $-1 \leq K1, K2 \leq 0.$

* * * * *